US008502695B2

(12) United States Patent
Kishimoto

(10) Patent No.: US 8,502,695 B2
(45) Date of Patent: Aug. 6, 2013

(54) LIGHT EMITTING DEVICE, ILLUMINATION DEVICE, AND PHOTO SENSOR

(75) Inventor: Katsuhiko Kishimoto, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 441 days.

(21) Appl. No.: 12/881,904

(22) Filed: Sep. 14, 2010

(65) Prior Publication Data

US 2011/0063115 A1 Mar. 17, 2011

(30) Foreign Application Priority Data

Sep. 15, 2009 (JP) ................................ 2009-213380

(51) Int. Cl.
*G08B 5/36* (2006.01)
*H01S 3/10* (2006.01)

(52) U.S. Cl.
USPC ................ 340/815.57; 340/815.55; 340/469; 372/21; 372/22; 372/29.014

(58) Field of Classification Search
USPC ................ 340/458, 468, 600, 815.4, 815.55, 340/815.56, 815.57, 815.65, 815.73, 815.75, 340/469; 353/85, 94, 98; 359/28, 326, 328; 362/84, 85, 257; 372/21, 22, 30, 29.011, 372/29.014; 250/206, 239
See application file for complete search history.

(56) References Cited

U.S. PATENT DOCUMENTS

| | | | | |
|---|---|---|---|---|
| 6,658,029 | B2 * | 12/2003 | Kaneda | 372/21 |
| 7,359,422 | B2 * | 4/2008 | Fujitani | 372/92 |
| 7,402,786 | B2 * | 7/2008 | Schofield et al. | 250/205 |
| 7,497,581 | B2 * | 3/2009 | Beeson et al. | 362/84 |
| 7,565,045 | B2 * | 7/2009 | Suzuki | 385/27 |
| 7,826,728 | B2 * | 11/2010 | Konno et al. | 396/16 |
| 8,168,920 | B2 * | 5/2012 | Terada et al. | 219/121.65 |
| 8,272,750 | B2 * | 9/2012 | Murata | 353/85 |

FOREIGN PATENT DOCUMENTS

| | | |
|---|---|---|
| JP | 7-318998 | 12/1995 |
| JP | 9-64445 | 3/1997 |
| JP | 2000-94172 | 4/2000 |
| JP | 2003-295319 | 10/2003 |
| JP | 2008-122838 | 5/2008 |
| JP | 2009-16543 | 1/2009 |
| JP | 2009-146938 | 7/2009 |

* cited by examiner

*Primary Examiner* — Van T. Trieu
(74) *Attorney, Agent, or Firm* — Morrison & Foerster LLP

(57) ABSTRACT

Provided is a light emitting device improved in safety to an eye. The light emitting device includes: a semiconductor laser element for emitting laser light; an optical conversion member for converting coherent laser light which is emitted from the semiconductor laser element into incoherent light, and for emitting the incoherent light; and a safety device for preventing the coherent laser light from exiting to an outside.

19 Claims, 8 Drawing Sheets

LIGHT EMITTING DEVICE, ILLUMINATION DEVICE, AND PHOTO SENSOR

This application is based on Japanese Patent Application No. 2009-213380 filed on Sep. 15, 2009, the contents of which are hereby incorporated by reference.

BACKGROUND OF THE INVENTION

1. Field of the Invention

The present invention relates to a light emitting device, an illumination device, and a photo sensor. In particular, the present invention relates to a light emitting device and an illumination device which include a semiconductor laser element, and to a photo sensor used in these devices.

2. Description of Related Art

In recent years, light emitting devices that use an LED have been attracting attention because an LED has a considerably longer lifetime than that of an incandescent lamp or a fluorescent lamp. Illumination devices and the like that use an LED as a white light emitting device have already been put into practical use. However, the power per LED element is generally low and a light emitting device that is required to have high power needs to use a plurality of LED elements, thus limiting the degree of downsizing of the light emitting device. Further, light emitting devices of higher luminance are demanded for use in automobile headlights and the like.

"Luminance" herein refers to a psychophysical quantity indicating the degree of brilliance, and is obtained by dividing the luminous intensity by the area of the light source.

Light emitting devices that use a semiconductor laser are gaining attention as this type of light emitting device (see JP 07-318998 A and JP 2003-295319 A, for example).

JP 07-318998 A discloses a light emitting device that includes an infrared ray generating device and a powder optical conversion material. The infrared ray generating device emits infrared light (laser light) (semiconductor laser element or the like). The powder optical conversion material converts, when irradiated with infrared light emitted by the infrared ray generating device, the infrared light into visible light and emits the visible light.

This light emitting device uses a semiconductor laser element or a similar laser light source as the infrared ray generating device, and uses infrared light, which is laser light, to irradiate the powder optical conversion material, which is placed at the focal point of a concave mirror and converts infrared light into visible light. The light emitting device is therefore reduced in size and high in luminous intensity. Moreover, the light emitting region of the light emitting device can be miniaturized, thereby realizing the light emitting device as a point light source that has excellent light collection properties.

FIG. 13 is a diagram illustrating the structure of a light emitting device disclosed in JP 2003-295319 A. As illustrated in FIG. 13, the light emitting device disclosed in JP 2003-295319 A includes an ultraviolet ray LD element (semiconductor laser element) 1001, which is a laser diode, a collimator lens 1003, which is a collimator provided in front of the ultraviolet ray LD element 1001, an aperture 1004, which is provided in front of the collimator lens 1003, a condenser lens 1005, which is a condenser provided in front of the aperture 1004, a fluorescent substance 1006, which is provided in front of the condenser lens 1005, an ultraviolet ray reflecting mirror 1007, which is a laser light reflecting mirror provided in front of the fluorescent substance 1006, and a visible light reflecting mirror 1009, which is provided such that the condenser lens 1005, the fluorescent substance 1006, and the ultraviolet ray reflecting mirror 1007 are placed inside its parabolic reflecting surface.

In this light emitting device, laser light 1002 which is coherent light emitted from the ultraviolet ray LD element 1001 is turned into a parallel pencil of rays upon passing through the collimator lens 1003, and passes through the aperture 1004 and the condenser lens 1005 to be collected to the fluorescent substance 1006. The incidence of the laser light 1002 on the fluorescent substance 1006 causes an excitation within the fluorescent substance 1006, and the laser light 1002 is absorbed in the fluorescent substance 1006 and reduced in intensity, with the result that spontaneous emission light 1008*a* which is incoherent light is emitted spontaneously from the fluorescent substance 1006. Light that has not been absorbed in the fluorescent substance 1006 leaks from the fluorescent substance 1006, but is reflected by the ultraviolet ray reflecting mirror 1007 to enter the fluorescent substance 1006 again. The fluorescent substance 1006 absorbs this light and emits the spontaneous emission light 1008*a*. The spontaneous emission light 1008*a* which is incoherent light spontaneously emitted from the fluorescent substance 1006 is reflected by the visible light reflecting mirror 1009 and turned into a parallel pencil of rays 1008*b*, which travels in a given direction.

"Coherent light" is light that has an identical phase temporally and spatially, and high coherence.

The light emitting device disclosed in JP 07-318998 A is stated to be effective as a light emitting device for optical communication, a light emitting device for projection, a light emitting device for exposure, and the like. However, when the powder optical conversion material which converts laser light into visible light is chipped off or otherwise develops a defect for some reason, it is a risk with this light emitting device that infrared light (laser light) emitted from the infrared ray generating device which is a laser light source (semiconductor laser element or the like) exits to the outside without being converted into visible light. Laser light emitted from a semiconductor laser element is coherent light, and if exiting to the outside without being converted into visible light, may be harmful to the human eye. This problem is particularly serious when this light emitting device is used as an illumination device such as an indoor illumination device, an automobile headlight, or a searchlight.

The light emitting device disclosed in JP 2003-295319 A converts an ultraviolet ray into light that has a longer wavelength than that of the ultraviolet ray, and therefore is superior to the light emitting device of JP 07-318998 A in terms of conversion efficiency.

However, the light emitting device of JP 2003-295319 A also has a risk that a chip or other defects in the fluorescent substance 1006 cause the laser light 1002 to be reflected by the ultraviolet ray reflecting mirror 1007 and by the visible light reflecting mirror 1009 and to exit to the outside. There is another risk that the laser light 1002 exits directly to the outside when the fluorescent substance 1006 or the ultraviolet ray reflecting mirror 1007 is displaced or falls off.

Further, in the case where blue laser light which is in the visible range and beginning to be put into practical use is employed and converted into incoherent light longer in wavelength than the blue laser light, the high conversion efficiency of this light emitting device is convenient as a laser light source, but the concern for the safety of the eye is more grave when blue laser light exits to the outside without being converted into incoherent light.

With any of the light emitting devices disclosed in the cited documents, there is a risk that laser light exits to the outside while remaining coherent light and enters a human eye when the optical conversion member which converts laser light into visible light (powder optical conversion material or fluorescent substance) is chipped off or otherwise develops a defect for some reason. The disclosed light emitting devices are thus lacking in safety. In short, a light emitting device that uses laser light converted into visible light or other types of incoherent light has a risk that a trouble in the optical conversion process causes laser light to exit to the outside, which is a safety problem never encountered by conventional light emitting devices.

To make matters worse, users of these light emitting devices may not notice the problem when a chip or other defects in the optical conversion member cause laser light to exit to the outside while remaining coherent light.

SUMMARY OF THE INVENTION

The present invention has been made to solve the above-mentioned problems, and an object of the present invention is therefore to provide a light emitting device and an illumination device in which a semiconductor laser element is used and safety to an eye is improved, and to provide a photo sensor used in these devices. Specifically, the present invention provides a light emitting device and an illumination device that include a safety device for preventing an accidental exit of coherent light to an outside due to an anomaly such as a chip in an optical conversion member which converts laser light into incoherent light (hereinafter referred to as optical conversion anomaly), and also provides a photo sensor used in these devices.

It is another object of the present invention to provide a light emitting device that employs a photo sensor used in the safety device to detect a state in which coherent light exits to the outside for other uses than the safety device as well.

In order to achieve the above-mentioned objects, a light emitting device according to a first aspect of the present invention includes: a semiconductor laser element for emitting laser light, which is coherent laser light; an optical conversion member for converting the coherent laser light which is emitted from the semiconductor laser element into incoherent light, and for emitting the incoherent light;

and a safety device for preventing the coherent laser light from exiting to an outside of the light emitting device In the light emitting device according to the first aspect which includes the safety device for preventing coherent laser light from exiting to the outside as described above, even when coherent laser light that is not converted into incoherent light is created due to an optical conversion anomaly such as chipping or function deterioration of the optical conversion member, which converts laser light into incoherent light, the coherent laser light is prevented from exiting to the outside. The light emitting device is therefore markedly improved in safety to the human body, especially to the human eye.

The present invention thus expands versatility in using the semiconductor laser element in the light emitting device, and provides the light emitting device that is easy to design and has a high degree of freedom as well as high conversion efficiency by combining the semiconductor laser element with other optical system components such as a lens and a mirror. The use of the semiconductor laser element also enables the light emitting device to miniaturize its light emitting region further than in, for example, a light emitting device using a halogen lamp or a light emitting diode, and the luminance of light exiting the light emitting device is accordingly higher. This realizes the light emitting device as a point light source that has excellent light collection properties and, as a result, the light emitting device is reduced in size. The light emitting device according to the first aspect is also reduced in power consumption than in the case where a halogen lamp, for example, is used.

In the light emitting device according to the first aspect, it is preferred that the safety device include a photo sensor for detecting intensity of at least one of the incoherent light and the coherent laser light exiting to the outside. An output of this photo sensor reflects a reduction in intensity of incoherent light obtained through a conversion by the optical conversion member, or an increase in intensity of laser light exiting to the outside. An optical conversion anomaly such as a chip in the optical conversion member can therefore be noticed in a timely manner from a change in output. This enables the light emitting device or a user to effectively take an action that prevents coherent laser light from exiting to the outside.

It is preferred that the light emitting device, in which the safety device includes the photo sensor, further include a determining part for comparing a detection output of the photo sensor against a reference value to determine whether or not the coherent laser light has exited to the outside. Further, it is preferred that when the photo sensor detects the intensity of the incoherent light, the determining part determine whether or not the intensity of the incoherent light detected by the photo sensor is equal to or less than a given value, and that when the photo sensor detects the intensity of the laser light, the determining part determine whether or not the intensity of the laser light detected by the photo sensor is equal to or more than a given value. When the optical conversion member is chipped off or otherwise develops a defect for some reason, the optical conversion member fails to convert laser light into incoherent light, or converts laser light into incoherent light of low intensity. In the case where the photo sensor is designed to detect the intensity of incoherent light, a chip or other defects in the optical conversion member lower the intensity of light detected by the photo sensor. In the case where the photo sensor is designed to detect the intensity of laser light, on the other hand, a chip or other defects in the optical conversion member enhance the intensity of light detected by the photo sensor. The determining part thus determines that an optical conversion anomaly such as a chip in the optical conversion member has occurred based on the intensity of light detected by the photo sensor. Based on an output from the determining part, an action to avoid risks caused by laser light can be taken immediately.

Further, it is preferred that the light emitting device including the determining part further include a control signal generating part for stopping laser light emission of the semiconductor laser element based on a determination output from the determining part indicating that the coherent laser light has exited to the outside. With this structure, when the optical conversion member is chipped off or otherwise develops a defect for some reason, the laser light emission of the semiconductor laser element is automatically stopped via the control signal generating part, and laser light is thus easily prevented from exiting to the outside.

In the case where the photo sensor is designed to detect the intensity of incoherent light, the photo sensor stops detecting incoherent light when laser light is no longer emitted because of damage to the semiconductor laser element or other components for some reason. Then, wasteful power consumption is avoided by stopping the supply of electric power to the semiconductor laser element.

Further, it is preferred that the light emitting device including the determining part further include an alarm part which is driven based on a determination output from the determining part indicating that the coherent laser light has exited to the outside. With this structure, the alarm part informs a user of an anomaly when the optical conversion member is chipped off or otherwise develops a defect for some reason. This enables the user to manually stop the laser light emission of the semiconductor laser element, or to change the direction of the light emitting device. The exit of laser light to the outside is thus prevented with ease.

In the light emitting device, in which the safety device includes the photo sensor, it is preferred that the photo sensor include: a first optical filter for blocking one of light that has substantially the same wavelength as a wavelength of the laser light and the incoherent light, and for transmitting at least a portion of another one of the light that has substantially the same wavelength as the wavelength of the laser light and the incoherent light; and a light receiving element for detecting intensity of light transmitted through the first optical filter. With this structure, the photo sensor is improved in sensitivity to light and, in addition, can detect one of incoherent light and laser light of various wavelengths by changing the characteristics of the first optical filter, without the trouble of changing the sensitivity to light of the light receiving element itself.

"Blocking light" herein refers to not only blocking light completely but also partially blocking light to, for example, a level that is safe to the eye.

In the light emitting device, in which the photo sensor includes the first optical filter and the light receiving element, it is preferred that the first optical filter be attached to the light receiving element. With this structure, the first optical filter just needs to be large enough to cover (obstruct) a portion of the light receiving element on which light is incident, and can therefore be reduced in size.

In the light emitting device, in which the photo sensor includes the first optical filter and the light receiving element, it is preferred that the first optical filter contain one of KRS-5 and KRS-6. KRS-5 blocks light that has a wavelength of approximately 500 nm or less and transmits light that has a wavelength longer than approximately 500 nm. KRS-6 blocks light that has a wavelength of approximately 410 nm or less and transmits light that has a wavelength longer than approximately 410 nm. In the case where the employed laser light source is, for example, a semiconductor laser element that emits laser light having a wavelength of approximately 500 nm or less, the first optical filter that is formed from KRS-5 easily blocks light having substantially the same wavelength as that of laser light emitted from the semiconductor laser element, and easily transmits at least a portion of light having a wavelength converted by the optical conversion member. In the case where the employed laser light source is, for example, a semiconductor laser element that emits laser light having a wavelength of approximately 410 nm or less, the first optical filter that is formed from KRS-6 easily blocks light having substantially the same wavelength as that of laser light emitted from the semiconductor laser element, and easily transmits at least a portion of light having a wavelength converted by the optical conversion member.

In the light emitting device, in which the safety device includes the photo sensor, it is preferred that the photo sensor be placed in a light path of the incoherent light to detect the intensity of the incoherent light. With this structure, the photo sensor can detect the intensity of incoherent light easily.

In the light emitting device, in which the safety device includes the photo sensor, it is preferred that the photo sensor be placed in an extension line extending on the optical conversion member side from a line that connects the semiconductor laser element and the optical conversion member, to detect the intensity of the coherent laser light exiting to the outside. This structure ensures that laser light enters the photo sensor when the optical conversion member is chipped off or otherwise develops a defect, and the photo sensor can thus detect the intensity of laser light easily.

In the light emitting device, in which the safety device includes the photo sensor, the photo sensor may include a photodiode.

It is preferred that the light emitting device according to the first aspect include a second optical filter, which is placed on a light exit side of the light emitting device to block the laser light. With this structure, the exit of laser light to the outside is easily prevented by the second optical filter even when the optical conversion member is chipped off or otherwise develops a defect. This structure is also simple and obtained just by placing a laser light blocking filter (second optical filter) on the light exit side of the light emitting device.

The second optical filter may be used in combination with the photo sensor, the control signal generating part, and other components described above. In this case, the exit of coherent laser light to the outside is prevented even for the brief period of time from the chipping of, or the development of other defects in, the optical conversion member for some reason to the stop of laser light emission of the semiconductor laser element. The safety to the eye is thus improved even more.

In the light emitting device according to the first aspect, it is preferred that the optical conversion member convert at least a portion of the laser light emitted from the semiconductor laser element into incoherent light having a wavelength longer than a wavelength of the laser light. With this structure, the conversion efficiency is improved compared to the case where at least a portion of laser light is converted into incoherent light having a shorter wavelength than that of the laser light. Another advantage of converting at least a portion of laser light into incoherent light having a longer wavelength than that of the laser light is that laser light emitted from the semiconductor laser element and at least a portion of incoherent light obtained through a conversion by the optical conversion member can have different wavelengths. This way, with the use of, for example, an optical filter, it is easy to block one of light that has substantially the same wavelength as that of laser light and incoherent light while transmitting at least a portion of another one of the light that has substantially the same wavelength as that of laser light and the incoherent light.

In the light emitting device, in which the optical conversion member converts at least a portion of the laser light into incoherent light having a wavelength longer than a wavelength of the laser light, it is preferred that the semiconductor laser element emit laser light that has a wavelength equal to or less than 500 nm. With this structure, the light emitting device can employ a semiconductor laser element that emits such laser light as blue light, blue-violet light, or ultraviolet light.

In the light emitting device, in which the semiconductor laser element emits laser light that has a wavelength equal to or less than 500 nm, it is preferred that the optical conversion member convert at least a portion of the laser light emitted from the semiconductor laser element into incoherent light having a wavelength longer than 500 nm. This way, with the use of, for example, an optical filter that blocks light having a wavelength of 500 nm or less and transmits light having a wavelength longer than 500 nm, or an optical filter that blocks light having a wavelength longer than 500 nm and transmits light having a wavelength of 500 nm or less, it is easy to block one of light that has substantially the same wavelength as that of laser light and incoherent light while transmitting at least a portion of another one of the light that has substantially the same wavelength as that of laser light and the incoherent light.

In the light emitting device, in which the optical conversion member converts at least a portion of the laser light into incoherent light having a wavelength longer than 500 nm, it is preferred that the semiconductor laser element emit one of blue laser light, blue-violet laser light, and ultraviolet laser light. With this structure, the wavelength of laser light emitted from the semiconductor laser element is approximately 450 nm or less. A larger difference is consequently created between the wavelength of laser light emitted from the semiconductor laser element (wavelength approximately equal to or less than 450 nm) and the wavelength of incoherent light obtained through wavelength conversion by the optical conversion member (wavelength longer than 500 nm). As a result, with the use of an optical filter, it is even easier to block one of light that has substantially the same wavelength as that of laser light and incoherent light while transmitting at least a portion of another one of the light that has substantially the same wavelength as that of laser light and the incoherent light.

An illumination device according to a second aspect of the present invention includes the light emitting device structured as above. This structure improves the illumination device that uses the semiconductor laser element in safety to the eye.

A photo sensor according to a third aspect of the present invention is a photo sensor for use in a safety device of a light emitting device that includes an optical conversion member for converting coherent laser light emitted from a semiconductor laser element into incoherent light, and for emitting the incoherent light, in which the photo sensor detects intensity of at least one of the incoherent light and the coherent laser light exiting to an outside of the light emitting device. With this structure, the photo sensor reflects on its output a reduction in intensity of incoherent light obtained through a conversion by the optical conversion member, or an increase in intensity of laser light exiting to the outside. An optical conversion anomaly such as a chip in the optical conversion member can therefore be noticed in a timely manner from a change in output. This enables the light emitting device or a user to effectively take an action that prevents coherent laser light from exiting to the outside of the light emitting device, and markedly improves the safety to the human body, especially to the human eye.

According to the third aspect of the present invention, it is preferred that the photo sensor include: a first optical filter for blocking one of light that has substantially the same wavelength as a wavelength of the laser light and the incoherent light subjected to wavelength conversion by the optical conversion member, and for transmitting at least a portion of another one of the light that has substantially the same wavelength as the wavelength of the laser light and the incoherent light subjected to the wavelength conversion by the optical conversion member; and a light receiving element for detecting intensity of light transmitted through the first optical filter. With this structure, the photo sensor is improved in sensitivity to light and, in addition, can detect one of incoherent light and laser light of various wavelengths by changing the characteristics of the first optical filter, without the trouble of changing the sensitivity to light of the light receiving element itself.

According to the third aspect of the present invention, it is preferred that the photo sensor further include a determining part for comparing a detection output of the photo sensor against a reference value to determine whether or not the coherent laser light has exited to the outside. Further, it is preferred that when the photo sensor detects the intensity of the incoherent light, the determining part determine whether or not the detected intensity of the incoherent light is equal to or less than a given value, and that when the photo sensor detects the intensity of the laser light, the determining part determine whether or not the detected intensity of the laser light is equal to or more than a given value. When the optical conversion member is chipped off or otherwise develops a defect for some reason, the optical conversion member fails to convert laser light into incoherent light, or converts laser light into incoherent light of low intensity. In the case where the photo sensor is designed to detect the intensity of incoherent light, a chip or other defects in the optical conversion member lower the intensity of light detected by the photo sensor. In the case where the photo sensor is designed to detect the intensity of laser light, on the other hand, a chip or other defects in the optical conversion member enhance the intensity of light detected by the photo sensor. The photo sensor structured as this can use the determining part to determine that an optical conversion anomaly such as a chip in the optical conversion member has occurred based on the intensity of light detected by the photo sensor. Based on the output from the determining part, an action to avoid risks caused by laser light can be taken immediately.

DETAILED DESCRIPTION OF PREFERRED EMBODIMENTS

Embodiments of the present invention are described below with reference to the drawings.

First Embodiment

Figure 1:
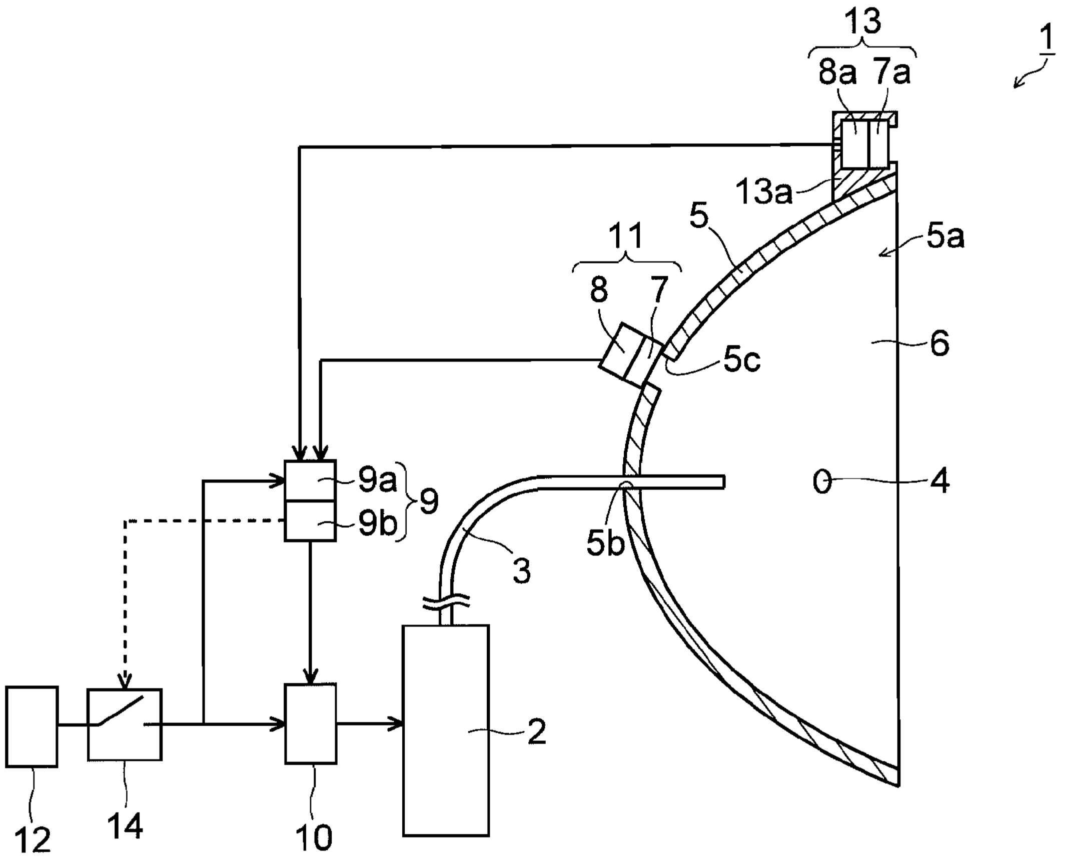
FIG. 1 is a diagram illustrating the structure of a light emitting device according to a first embodiment of the present invention.
Figure 2:
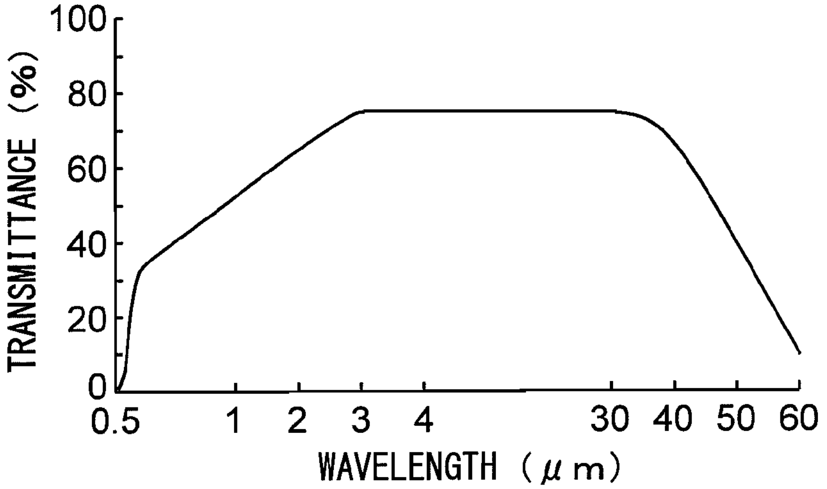
FIG. 2 is a graph showing the transmittance characteristics of an optical filter (KRS-5) of the light emitting device according to the first embodiment of the present invention which is illustrated in FIG. 1.
Figure 3:
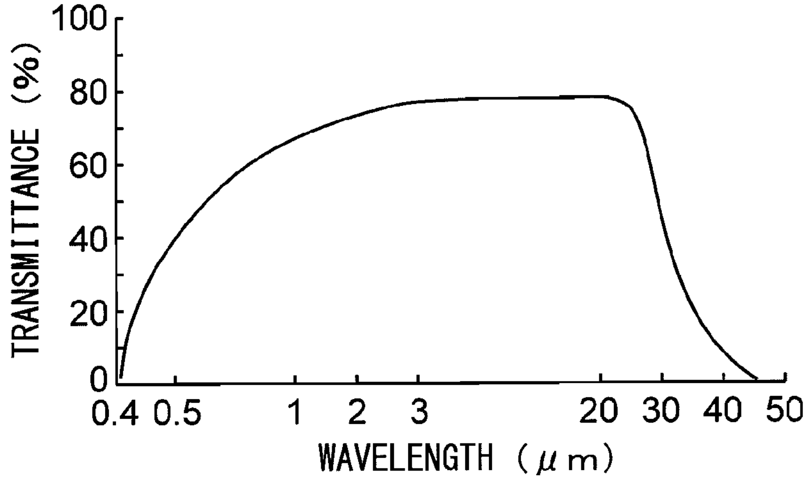
FIG. 3 is a graph showing the transmittance characteristics of another optical filter (KRS-6) of the light emitting device according to the first embodiment of the present invention which is illustrated in FIG. 1.

The structure of a light emitting device 1 according to a first embodiment of the present invention is described first with reference to FIGS. 1 to 3.

The light emitting device 1 according to the first embodiment of the present invention can be used also as an illumination device such as an automobile headlight, and includes components illustrated in FIG. 1. The components are: a semiconductor laser element 2 which functions as a laser light source (and emits, for example, blue-violet laser light); a light guiding member 3 which guides laser light emitted from the semiconductor laser element 2 into a concave part 5*a* of a reflecting member 5 constituting a parabolic mirror; a fluorescent substance 4 which is positioned at a focal point in the concave part 5*a* of the reflecting member 5 to be irradiated with laser light guided by the light guiding member 3 and to convert the laser light into visible light, mainly of a blue color, a green color, and a red color; a transparent member 6 which is placed within the concave part 5*a* of the reflecting member 5 to cover the fluorescent substance 4; and a driver circuit 10 for driving the semiconductor laser element 2.

Blue light, green light, and red light radiated from the fluorescent substance 4 to the surrounding space are reflected by the inner surface of the reflecting member 5 and turned into parallel rays, which travel toward the front side of the reflecting member 5. When mixed together, the blue visible light, the green visible light, and the red visible light constitute white light, and the light emitting device 1 accordingly emits white visible light to the outside.

On the outer side of the reflecting member 5, a light receiving element 8 is provided in an area where an opening 5*c* is opened. The light receiving element 8 receives light radiated from the fluorescent substance 4 through the opening 5*c*, and outputs a signal having a magnitude corresponding to the intensity of the received light. An optical filter 7 is interposed between the opening 5*c* and the light receiving element 8, and has a function of blocking light that has a wavelength of approximately 500 nm or less (including laser light wavelengths). The optical filter 7 and the light receiving element 8 constitute a photo sensor 11.

A control part 9 is electrically connected to the light receiving element 8, and includes a determining part 9*a*, which determines whether or not an output of the light receiving element 8 (detection output of the photo sensor 11) is equal to or less than a given value (reference value), and a control signal generating part 9*b*, which controls the driver circuit for driving the semiconductor laser element 2 based on a determination output by the determining part 9*a*.

The control part 9 and the driver circuit 10 receive a supply of electric power from a power source 12 via a known measure.

The light receiving element 8 of the photo sensor 11 receives light that has a wavelength longer than approximately 500 nm from the fluorescent substance 4 in the manner described above, and outputs a signal having a magnitude corresponding to the intensity of the received light. When the fluorescent substance 4 is damaged or chipped off, thereby causing laser light to exit to the outside as it is (optical conversion anomaly), in other words, when the fluorescent substance 4 loses the ability to convert laser light into visible light, the absence of light that has a wavelength longer than approximately 500 nm, such as green light and red light, lowers the output of the light receiving element 8 significantly. The lowered output is determined as equal to or less than the given value by the determining part 9*a* of the control part 9. Then the control signal generating part 9*b* sends a stop signal to the driver circuit 10 to stop the driving of the semiconductor laser element 2.

By controlling the components in this manner, laser light is prevented from exiting the light emitting device 1. In other words, the photo sensor 11 and the control part 9 operate as a safety device which stops the driving of the semiconductor laser element 2 in the event of damage to or chipping of the fluorescent substance 4.

The fluorescent substance 4 is an example of an "optical conversion member" of the present invention. The fluorescent substance 4, the light guiding member 3, and the transparent member 6, which contributes to the positioning of the light guiding member 3 inside the reflecting member 5, constitute an optical conversion mechanism for correctly converting laser light into visible light via the fluorescent substance 4. When something is wrong with one of the components of the optical conversion mechanism (fluorescent substance 4, light guiding member 3, and transparent member 6), there is a risk that the operation of converting laser light into visible light does not work properly. The optical filter is an example of a "first optical filter" of the present invention.

The components of the light emitting device 1 are described below in detail. The semiconductor laser element 2 in the first embodiment emits blue-violet laser light having its center wavelength around 405 nm. Alternatively, the employed semiconductor laser element may emit laser light having a wavelength approximately equal to or less than 500 nm that is not blue-violet light. To give a concrete example, a semiconductor laser element that has a function of emitting blue laser light or ultraviolet laser light may be employed. Blue laser light is laser light having its center wavelength around 450 nm. Ultraviolet laser light is laser light having its center wavelength at some point between approximately 10 nm and 380 nm (ranging over approximately 360 nm to 400 nm).

Laser light emitted from the semiconductor laser element 2 generally has a very high light emission wavelength peak only around the lasing wavelength of the semiconductor laser element 2, and hardly contains a light component that has a wavelength off the center wavelength of lasing.

Laser light emitted from the semiconductor laser element 2 is coherent light.

The light guiding member 3 is formed from, for example, a quartz glass optical fiber or a plastic optical fiber. The light guiding member 3 has a diameter of, for example, approximately 0.1 mm to 3.0 mm.

An end of the light guiding member 3 from which light exits is placed within the concave part 5*a* of the reflecting member 5 and positioned to face the fluorescent substance 4. The light guiding member 3 has a function of guiding incident laser light to the fluorescent substance 4 while reflecting the laser light by total reflection.

Light subjected to wavelength conversion by the fluorescent substance 4 is incoherent light with a very broad spectrum which has a full width at half maximum approximately from 50 nm to over 100 nm.

Some of laser light from the semiconductor laser element 2 does not undergo wavelength conversion. The fluorescent substance 4 has a function of diffusing this laser light to thereby ensure that the laser light exits as incoherent light.

The light subjected to wavelength conversion and the light converted into incoherent light without undergoing wavelength conversion may be mixed together. For instance, blue incoherent light and yellow light subjected to wavelength conversion are mixed to obtain pseudo-white light. Employing the semiconductor laser element 2 that emits blue light is effective for this case. In the case of the semiconductor laser element 2 that emits the blue-violet light described above, blue light, green light, and red light subjected to wavelength conversion are mixed to obtain white light. The conversion efficiency is about 60% to 80% in either case.

A portion of laser light irradiating the fluorescent substance 4 is sometimes transmitted through the fluorescent substance 4. The first embodiment is structured such that the coherent component of light accidentally transmitted through the fluorescent substance 4 and exiting to the outside is at the level of Class 1 of the laser light safety standard in Japan (JIS C 6802) or lower. The coherent component of light accidentally transmitted through the fluorescent substance 4 is readily reduced to a safe level by, for example, increasing the thickness of the fluorescent substance 4 or changing the material of the fluorescent substance 4.

The fluorescent substance 4 may be in granular form. Alternatively, the fluorescent substance 4 may be dispersed in a transparent resin (not shown) to constitute a light emitting part.

The fluorescent substance 4 which is placed at the focal point of the concave part 5*a* in the reflecting member 5 may instead be placed at a point off the focal point.

The inner surface of the concave part 5*a* of the reflecting member 5 is formed into a parabolic mirror which has a function of reflecting light. Instead of a paraboloid, the inner surface of the concave part 5*a* may be, for example, a partial ellipsoid. The inner surface of the concave part 5*a* may also be asymmetric in the top-bottom direction or in the left-right direction. The inner surface of the concave part 5*a* of the reflecting member 5 does not need to be a mirror surface as long as the inner surface has a function of reflecting light.

An insertion hole 5*b* to which the light guiding member 3 is inserted is formed at the center of the reflecting member 5.

The transparent member 6 has a function of holding the fluorescent substance 4 in a given place. The transparent member 6 is formed from, for example, glass, and preferably is transmissive of light and moisture-resistant.

The optical filter 7 has, as described above, a function of blocking light that is approximately 500 nm or less in wavelength (light emitted from the semiconductor laser element 2 that does not undergo wavelength conversion by the fluorescent substance 4). The optical filter 7 also has a function of transmitting light that has a wavelength longer than approximately 500 nm (at least a portion of light that has been subjected to wavelength conversion by the fluorescent substance 4).

To give a concrete example, the optical filter 7 is formed from KRS-5 (thallium bromide iodide: a mixed crystal of TlBr (45.7%)+TlI (54.3%)) or KRS-6 (thallium bromide chloride: a mixed crystal of TlBr (29.8%)+TlCl (70.2%)).

When formed from KRS-5, the optical filter 7 blocks blue light, blue-violet light, ultraviolet light, or similar light while transmitting light that has a wavelength longer than approximately 500 nm (=approximately 0.5 μm), such as green light, yellow light, orange light, red light, and infrared light, as shown in FIG. 2. Therefore, in the case where the employed semiconductor laser element 2 emits blue laser light, blue-violet laser light, or ultraviolet laser light, light that does not undergo wavelength conversion by the fluorescent substance 4 has a very steep single peak and is easily blocked by the optical filter 7. Meanwhile, at least a portion of light subjected to wavelength conversion by the fluorescent substance 4 is broad light created by the conversion, and is easily transmitted through the optical filter 7.

When formed from KRS-6, the optical filter 7 blocks blue-violet light, ultraviolet light, or similar light while transmitting light that has a wavelength longer than approximately 410 nm (=approximately 0.41 μm), such as yellow light, blue light, green light, red light, and infrared light, as shown in FIG. 3. Therefore, in the case where the employed semiconductor laser element 2 emits blue-violet laser light or ultraviolet laser light, light that has not undergone wavelength conversion by the fluorescent substance 4 is easily blocked by the optical filter 7. Meanwhile, at least a portion of light subjected to wavelength conversion by the fluorescent substance 4 is easily transmitted through the optical filter 7. The semiconductor laser element 2 that emits ultraviolet laser light is preferred when the optical filter 7 is formed from KRS-6.

The optical filter 7 may be attached to the light receiving element 8 as illustrated in FIG. 1, or may be placed at a given distance from the light receiving element 8.

The light receiving element 8 is disposed in the light path of light subjected to wavelength conversion by the fluorescent substance 4, and has a function of detecting light that has been transmitted through the optical filter 7.

The light receiving element 8 in the first embodiment is formed of, for example, a semiconductor light receiving element such as a Si photodiode, a GaAs photodiode, or an InGaAs photodiode.

A Si photodiode and a GaAs photodiode have a function of detecting mainly visible light. An InGaAs photodiode, on the other hand, has a function of detecting mainly infrared light. Therefore, in the case where the light receiving element 8 is built from an InGaAs photodiode, the fluorescent substance 4 is given a composition that converts laser light into light containing not only yellow light, blue light, green light, and red light but also infrared light. With this structure, light subjected to wavelength conversion by the fluorescent substance 4 (infrared light) can be detected with the use of an InGaAs photodiode. The light receiving element 8 is not limited to a semiconductor light receiving element and may be a photoelectric tube, a photomultiplier tube, or the like.

The light receiving element 8 itself may be given characteristics that are responsive only to a specific wavelength within the wavelength range of visible rays. Then light converted by the fluorescent substance 4 can be detected efficiently without using the optical filter 7.

In the case of the photo sensor 11 that is constituted of the light receiving element 8 alone and does not include the optical filter 7, too, when the fluorescent substance 4 is partially chipped off or falls off entirely, detecting an optical conversion anomaly is not impossible but is difficult particularly if the deteriorated function or the like of the fluorescent substance 4 causes laser light to be reflected on the surface of the fluorescent substance 4. It is therefore preferable for the photo sensor 11 to include the optical filter 7. The optical filter 7 is also preferably placed between the fluorescent substance 4 and the light receiving element 8 because there is a possibility that a chip or other defects in the fluorescent substance 4 may cause laser light to be reflected by a not-shown member and enter the light receiving element 8.

When the intensity of light detected by the light receiving element 8 (value of a current flowing through the light receiving element 8) is equal to or less than a given value (reference value), the control part 9 determines that the fluorescent substance 4 has stopped emitting light for some reason, and outputs a stop signal for stopping the driving of the semiconductor laser element 2 (laser light emission) to the driver circuit 10. Instead, a self-latching relay switch 14 may be provided along the supply route from the power source 12 to cut off the supply of electric power itself.

The output value of the light receiving element 8 is measured in advance, with ambient light or the like being prevented from entering the light receiving element 8. When the measured output value is used as an initial value and a threshold (given value) at which the control part 9 outputs a stop signal to the driver circuit 10 is set to, for example, a value half the initial value, a malfunction of the control part 9 due to the incidence of ambient light or the like on the light receiving element 8 can be averted. In other words, this prevents the control part 9 from falsely determining, from a current flow in the light receiving element 8 caused by the incidence of ambient light or the like on the light receiving element 8, that the fluorescent substance 4 is emitting light when actually the fluorescent substance 4 has stopped light emission for some reason.

However, when this light emitting device 1 is used as an automobile headlight or other illumination devices, ambient light such as sunlight or natural light enters the light receiving element 8. Natural light, containing light of every wavelength, is transmitted through the optical filter 7 and causes a current to flow in the light receiving element 8 in an amount corresponding to the composition of the transmitted natural light. Consequently, the fluorescent substance 4 may mistakenly be determined to be operating normally when actually the amount of light converted is reduced due to damage to or other defects in the fluorescent substance 4. This is avoidable with the use of a monitor sensor 13, which, as illustrated in FIG. 1, is placed at a point along the circumference of the reflecting member 5 where ambient light enters but converted light from the fluorescent substance 4 does not enter. The monitor sensor 13 includes an optical filter 7*a* and a light receiving element 8*a* which are identical in terms of performance and structure to the optical filter 7 and the light receiving element 8, respectively. An output of the monitor sensor 13 is input to the control part 9 for comparison. The determining part 9*a* calculates a difference between the output of the light receiving element 8 of the photo sensor 11 and the output of the light receiving element 8*a* of the monitor sensor 13, and compares the difference against the threshold (given value) to remove effects of ambient light on a determination. A component denoted by 13*a* is a case for fixing the light receiving element 8*a* and the optical filter 7*a* in place.

The light emitting device 1 does not always need to include the monitor sensor 13, specifically when used as a light emitting device for communication, a light emitting device for exposure, and the like where the intensity of incident ambient light such as natural light is not very high. When used as an illumination device such as an automobile headlight, a searchlight, or a light emitting device for indoor illumination, on the other hand, the light emitting device 1 that is equipped with the monitor sensor 13 operates with higher precision.

The threshold (given value) at which the control part 9 outputs a stop signal to the driver circuit 10 can be set to, for example, a value half the initial value, which coincides with the common lifetime of the semiconductor laser element 2. Then the user can be notified of the expiration of the lifetime of the semiconductor laser element 2 by the fact that the driving of the semiconductor laser element 2 has stopped. In this case, an alarm part is provided as described later to inform the user of the expiration of the lifetime instead of stopping the driving of the semiconductor laser element 2 immediately.

An output of the light receiving element 8 can be utilized not only for the safety device but also as an output for detecting the expiration of the lifetime of the semiconductor laser element 2 as described above. In particular, when it is incoherent light that the light receiving element 8 is designed to detect the intensity of, an output of this light receiving element 8 reflects the intensity of outward exit light of the light emitting device 1, and can therefore be utilized also as a feedback output for adjusting the intensity of outward exit light.

The driver circuit 10 is structured to supply electric power to the semiconductor laser element 2 upon input of a drive signal from the control signal generating part 9*b* of the control part 9. The driver circuit 10 is also structured to stop supplying electric power to the semiconductor laser element 2 upon input of a stop signal from the control signal generating part 9*b*.

Figure 4:
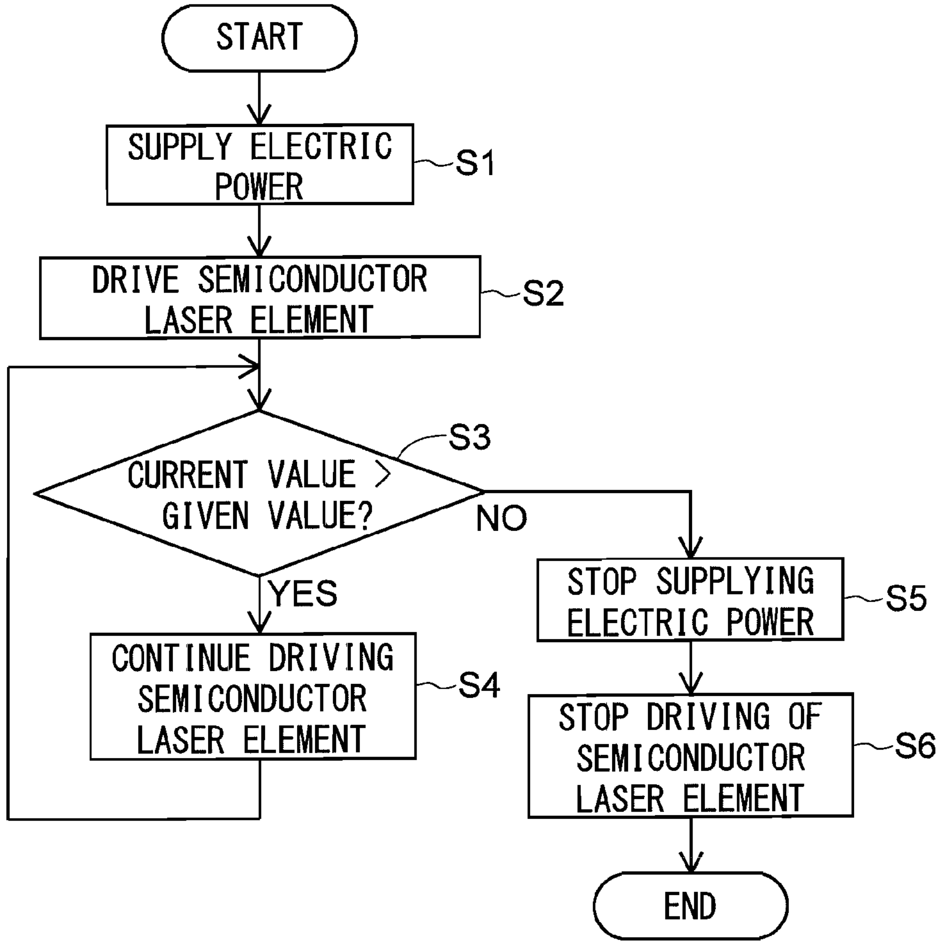
FIG. 4 is a flow chart illustrating the operation of the light emitting device according to the first embodiment of the present invention which is illustrated in FIG. 1.

A detailed description is given next with reference to FIG. 4 on the operation of the light emitting device 1 according to the first embodiment of the present invention.

As illustrated in FIG. 4, the user performs a given operation (operation of turning on the self-latching relay switch 14) in Step S1, thereby causing the control part 9 to output a drive signal to the driver circuit 10, which then supplies electric power to the semiconductor laser element 2. As a result, the semiconductor laser element 2 is driven in Step S2 to emit laser light that has its center wavelength around 405 nm.

The laser light emitted from the semiconductor laser element 2 irradiates the fluorescent substance 4. The fluorescent substance 4 converts at least a portion of the laser light emitted from the semiconductor laser element 2 into green light and red light (visible light), which have wavelengths longer than approximately 500 nm and exit the fluorescent substance 4. The rest of the laser light emitted from the semiconductor laser element 2 is converted into light that has a wavelength approximately equal to or less than 500 nm, such as blue light, or is diffused instead of undergoing wavelength conversion by the fluorescent substance 4, before exiting the fluorescent substance 4.

The green light and the red light (visible light) which are created through wavelength conversion by the fluorescent substance 4 and have wavelengths longer than approximately 500 nm are transmitted through the optical filter 7, whereas light that has a wavelength approximately equal to or less than 500 nm (including light that does not undergo wavelength conversion by the fluorescent substance 4) is blocked by the optical filter 7.

In Step S3, a current flows through the light receiving element 8 in an amount corresponding to the intensity of the light transmitted through the optical filter 7. When the determining part 9*a* determines that the amount of this current is larger than a given value, it is determined that there is no anomaly in the semiconductor laser element 2 and the fluorescent substance 4 (that the fluorescent substance 4 is emitting light), and the processing proceeds to Step S4.

In Step S4, the semiconductor laser element 2 continues to be driven (continues to emit laser light). Thereafter, the processing returns to Step S3, where the determination of Step S3 is repeated.

In the case where the fluorescent substance 4 is chipped off or otherwise develops a defect for some reason, most of laser light emitted from the semiconductor laser element 2 exits directly to the outside without irradiating the fluorescent substance 4. Consequently, no light having a wavelength longer than approximately 500 nm is created and enters the light receiving element 8. Even if the laser light or light that has not undergone wavelength conversion by the fluorescent substance 4 travels toward the light receiving element 8 because of reflection or some other factors, the optical filter 7 blocks the light.

A case where the fluorescent substance 4 is chipped off or otherwise develops a defect means a case where the fluorescent substance 4 is partially chipped or falls off entirely, or is burnt on the surface to a degree that its function is deteriorated, and thus becomes unable to convert laser light into visible light.

Then the determining part 9*a* determines in Step S3 that the value of a current flowing in the light receiving element 8 is equal to or less than the given value, and that the fluorescent substance 4 is not emitting light, and the processing proceeds to Step S5.

In Step S5, the control signal generating part 9*b* of the control part 9 outputs a stop signal to the driver circuit 10 to stop the driver circuit 10 from driving the semiconductor laser element 2. Instead of stopping the driver circuit 10, the relay switch 14 for the power source 12 may be turned off to stop the supply of electric power to the driver circuit 10. In Step S6, the driving of the semiconductor laser element 2 (laser light emission) ceases, and the processing is ended.

In the case where the semiconductor laser element 2 is damaged for some reason and stops emitting laser light, the value of a current flowing in the light receiving element 8 is equal to or less than the given value in Step S3. Therefore, as is the case where the fluorescent substance 4 is chipped off or otherwise develops a defect, the determining part 9*a* determines that the fluorescent substance 4 is not emitting light and the processing proceeds to Step S5.

Subsequently, a stop signal is output to the driver circuit 10 in Step S5, the driving of the semiconductor laser element 2 is stopped in Step S6, and the processing is ended at that point.

In the first embodiment, where the semiconductor laser element 2 is used to excite the fluorescent substance 4 as described above, the light emitting region (light emitting part including the fluorescent substance) is miniaturized further than in, for example, a light emitting device that uses a halogen lamp or a light emitting diode, and the luminance of light exiting the light emitting device 1 is accordingly higher. The light emitting device 1 can thus be a point light source that has excellent light collection properties. The light emitting device 1 is therefore easy to design and has high degree of freedom as well as high conversion efficiency by combining the semiconductor laser element 2 with other optical system components such as a lens and a mirror. As a result, the light emitting device 1 is reduced in size. The light emitting device 1 according to the first embodiment is also reduced in power consumption than in the case where a halogen lamp, for example, is used.

In the first embodiment, the light emitting device 1 includes, as described above, the fluorescent substance 4, which performs wavelength conversion on laser light emitted from the semiconductor laser element 2 to convert at least a portion of the laser light into light having a wavelength longer than approximately 500 nm (visible light), the optical filter 7, which blocks light that has not undergone wavelength conversion by the fluorescent substance 4 and transmits at least a portion of the light subjected to wavelength conversion by the fluorescent substance 4, and the light receiving element 8, which detects light transmitted through the optical filter 7. When the fluorescent substance 4 does not have a chip or any other defect, at least a portion of laser light emitted from the semiconductor laser element 2 is converted by the fluorescent substance 4 into light having a wavelength longer than approximately 500 nm, and at least a portion of the light created by the conversion is transmitted through the optical filter 7 and detected by the light receiving element 8. When the fluorescent substance 4 is chipped off or otherwise develops a defect for some reason, on the other hand, laser light emitted from the semiconductor laser element 2 is not converted into light having a wavelength longer than approximately 500 nm. Then the light that has not undergone wavelength conversion by the fluorescent substance 4 is blocked by the optical filter 7 and is not detected by the light receiving element 8. In other words, the intensity of light detected by the light receiving element 8 (value of a current flowing through the light receiving element 8) can be used to determine that the fluorescent substance 4 has a chip or other defects. The exit of coherent light (laser light) to the outside due to a chip or other defects in the fluorescent substance 4 is thus prevented by stopping the driving (laser light emission) of the semiconductor laser element 2. As a result, the safety to the human body, especially to the human eye, is markedly improved.

In the first embodiment, the light receiving element 8 stops detecting light from the semiconductor laser element 2 also when the semiconductor laser element 2 or other components are damaged for some reason and become unable to emit laser light. The supply of electric power to the semiconductor laser element 2 is therefore stopped, to thereby prevent wasteful power consumption.

In the first embodiment, the semiconductor laser element 2 which emits laser light is employed as described above. Laser light emitted from the semiconductor laser element 2 has a very steep peak (so-called single-peak wavelength). It is therefore easy to block light that has not undergone wavelength conversion by the fluorescent substance 4 with the use of the optical filter 7 while transmitting at least a portion of light subjected to wavelength conversion by the fluorescent substance 4.

In the first embodiment, as described above, the optical filter 7 is provided and the light receiving element 8 only detects light that has been subjected to wavelength conversion by the fluorescent substance 4 and transmitted through the optical filter 7. This structure improves the sensitivity to light of the photo sensor 11 and thereby facilitates the determination of a chip or other defects in the fluorescent substance 4, which is based on the intensity of light detected by the light receiving element 8.

In the first embodiment, at least a portion of laser light is converted into light having a wavelength longer than that of the laser light. The conversion efficiency is therefore improved compared to cases where at least a portion of laser light is converted into light having a wavelength shorter than that of the laser light.

Given next with reference to the drawings is a description on concrete structural examples of the optical filter and the light receiving element that have been described in the first embodiment. The optical filter and the light receiving element, however, are not limited to the following structures.

Figure 5:
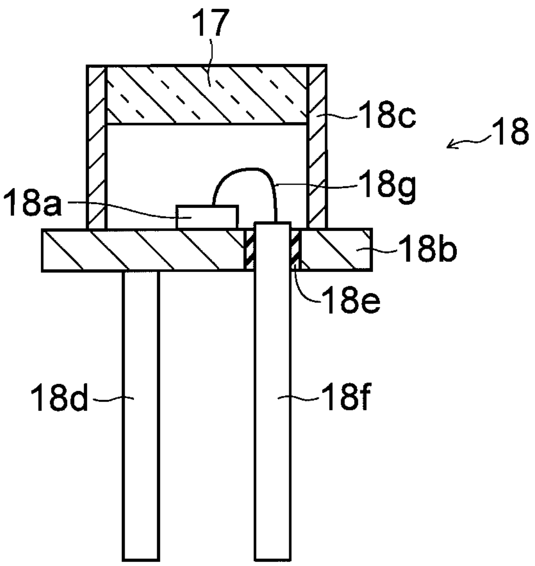
FIG. 5 is a sectional view illustrating a concrete structural example of an optical filter and a light receiving element of the light emitting device according to the first embodiment of the present invention which is illustrated in FIG. 1.

As illustrated in FIG. 5, a light receiving element (photodiode) 18 includes: a photodiode chip 18*a*; a stem 18*b* to which the photodiode chip 18*a* is mounted; a cylindrical part 18*c* made of a metal and attached to the stem 18*b* so as to stand on the stem 18*b*; one terminal 18*d* electrically connected to the stem 18*b*; and another terminal 18*f* fixed to the stem 18*b* via an insulating member 18*e*.

The rear face of the photodiode chip 18*a* is fixed to the stem 18*b* by a conductive adhesive (not shown). The rear face of the photodiode chip 18*a* is thus electrically connected to the stem 18*b* and the one terminal 18*d*. The top face of the photodiode chip 18*a* is electrically connected to the another terminal 18*f* via a metal wire 18*g*.

The stem 18*b* and the cylindrical part 18*c* have light-shielding properties.

The cylindrical part 18*c* has an open end to which an optical filter 17 is attached. To elaborate, the optical filter 17 in this example is formed integrally with the light receiving element 18. The optical filter 17 may have a flat board shape or a lens shape. The optical filter 17 is an example of the "first optical filter" of the present invention.

Attaching the optical filter 17 to the light receiving element 18 in the manner described above means that the optical filter 17 only needs to be large enough to cover a portion of the light receiving element 18 on which light is incident (open end of the cylindrical part 18*c*). The optical filter 17 is thus reduced in size.

Figure 6:
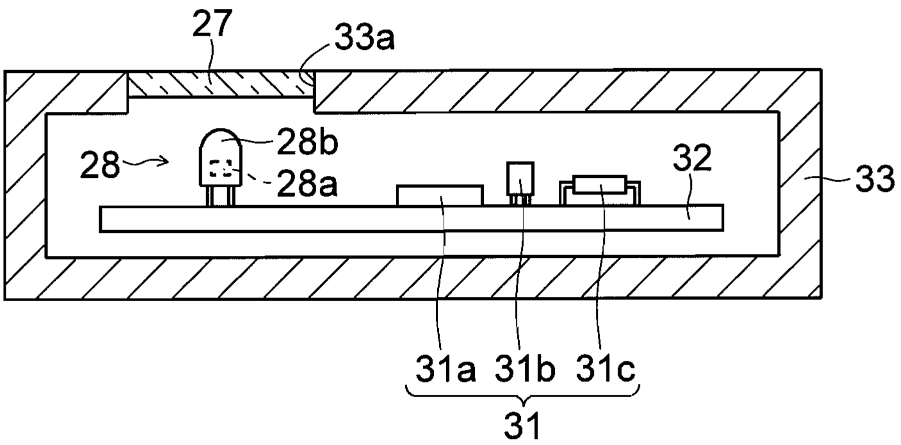
FIG. 6 is a sectional view illustrating another concrete structural example of the optical filter and the light receiving element in the light emitting device according to the first embodiment of the present invention which is illustrated in FIG. 1.

FIG. 6 illustrates a structural example in which the optical filter and the light receiving element are not formed integrally with each other. In FIG. 6, a light receiving element 28 is attached to a printed wiring board 32 together with a plurality of electronic parts 31 (31*a*, 31*b*, and 31*c*).

The light receiving element 28 does not include a cylindrical part, and a photodiode chip 28*a* is entirely covered with a sealing resin 28*b*.

The light receiving element 28 and the printed wiring board 32 are housed in a casing 33, which is made of a metal and has an opening 33*a*. The casing 33 has light-shielding properties. The opening 33*a* of the casing 33 is formed above the light receiving element 28.

An optical filter 27 is attached to the opening 33*a* of the casing 33. The optical filter 27 may have a flat board shape or a lens shape. The optical filter 27 is an example of the "first optical filter" of the present invention.

Second Embodiment

In a second embodiment of the present invention, a case where an optical filter blocks, unlike the first embodiment, light subjected to wavelength conversion is described with reference to FIGS. 7 and 8.

Figure 7:
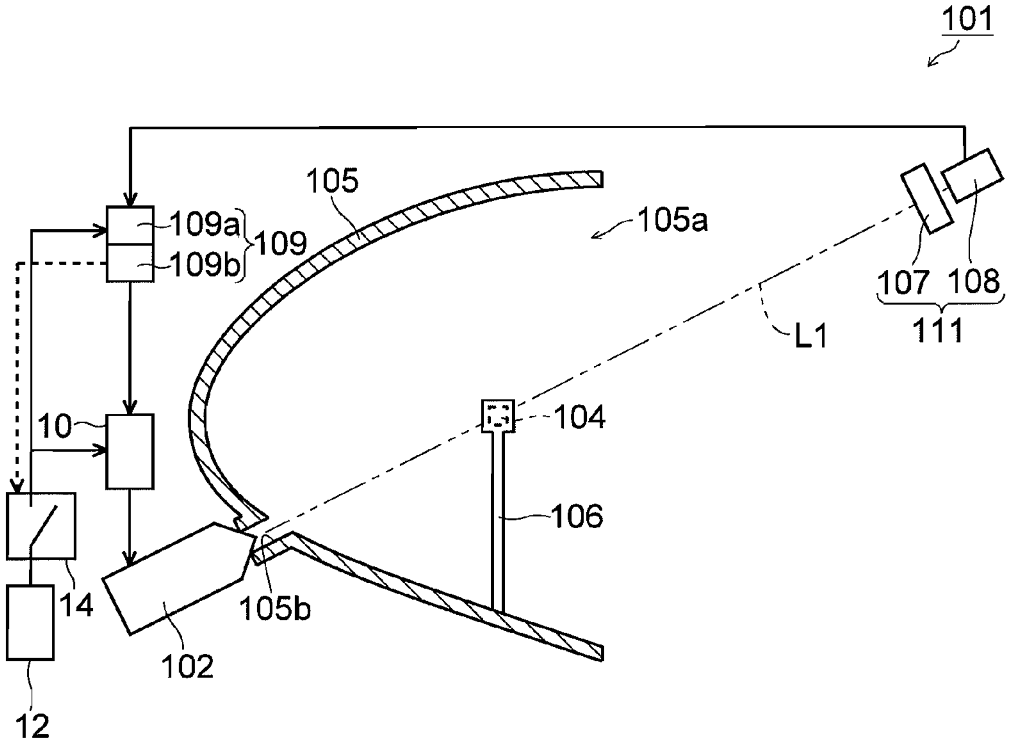
FIG. 7 is a diagram illustrating the structure of a light emitting device according to a second embodiment of the present invention.
Figure 8:
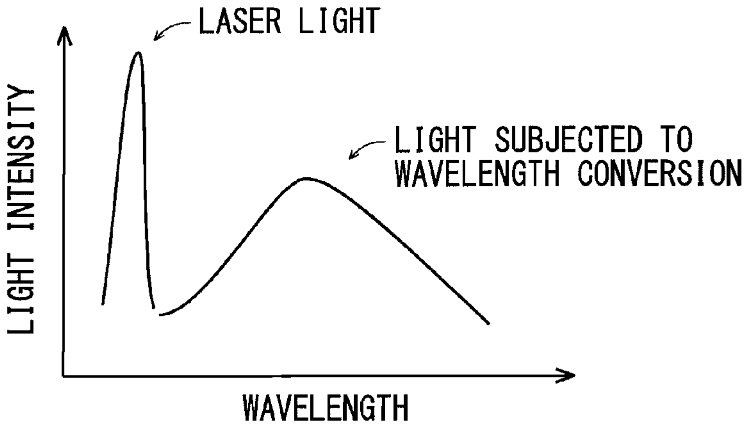
FIG. 8 is a graph showing the light intensity characteristics of laser light and light that has been subjected to wavelength conversion in the light emitting device according to the second embodiment of the present invention which is illustrated in FIG. 7.

A light emitting device 101 according to the second embodiment of the present invention includes, as illustrated in FIG. 7, a semiconductor laser element 102, which functions as a laser light source, a fluorescent substance 104, which is irradiated with laser light emitted from the semiconductor laser element 102, a holding member 106, which is placed within a concave part 105*a* of a reflecting member 105 to hold the fluorescent substance 104, an optical filter 107, which has a function of blocking light that has a given wavelength, a light receiving element 108, a control part 109, which is electrically connected to the light receiving element 108, and the driver circuit 10, which is electrically connected to the semiconductor laser element 102 and the control part 109. The fluorescent substance 104 is an example of the "optical conversion member" of the present invention, and the optical filter 107 is an example of the "first optical filter" of the present invention.

The reflecting member 105 has an opening 105*b* formed therein, and the semiconductor laser element 102 is placed on the outside of the opening 105*b*.

The holding member 106 has a function of fixing the fluorescent substance 104 in a given place. The holding member 106 is fixed to the reflecting member 105. The holding member 106 may be formed from a material that is transmissive of light and moisture-resistant such as glass to bury the fluorescent substance 4 in the holding member 106.

A metal or other materials that are not transmissive of light may also be used to form the holding member 106. In this case, a portion of the holding member 106 that holds the fluorescent substance 104 may be formed from glass whereas a portion of the holding member 106 that is fixed to the reflecting member 105 is formed from a metal or the like.

The holding member 106 may be fixed to the reflecting member 105 in a plurality of (preferably, three or more) places. This structure prevents vibration or the like from displacing the fluorescent substance 104 from the given place.

In the second embodiment, the optical filter 107 and the light receiving element 108 constitute a photo sensor 111. The photo sensor 111 is placed in an extension line L1 extending on the side of the fluorescent substance 104 from a line connecting the semiconductor laser element 102 and the fluorescent substance 104.

Accordingly, when the fluorescent substance 104 is in a normal state (when there is no anomaly in the fluorescent substance 104), laser light emitted from the semiconductor laser element 102 irradiates the fluorescent substance 104 and is converted into visible light, and almost none of the laser light emitted from the semiconductor laser element 102 reaches the optical filter 107 (light receiving element 108). The light subjected to wavelength conversion by the fluorescent substance 104 (visible light) irradiates the optical filter 107 (light receiving element 108).

A portion of laser light irradiating the fluorescent substance 104 is sometimes transmitted through the fluorescent substance 104. The second embodiment is structured such that, when the light receiving element 108 is irradiated with light accidentally transmitted through the fluorescent substance 104, the intensity of light detected by the light receiving element 108 (value of a current flowing through the light receiving element 108) does not reach a given value (threshold) or higher. The second embodiment is also structured such that, as in the first embodiment, the coherent component of light accidentally transmitted through the fluorescent substance 104 is at the level of Class 1 of the laser light safety standard in Japan (JIS C 6802) or lower.

On the other hand, when the fluorescent substance 104 is chipped off or otherwise develops a defect for some reason, laser light emitted from the semiconductor laser element 102 directly irradiates the optical filter 107 (light receiving element 108) without undergoing wavelength conversion.

The optical filter 107 in the second embodiment is therefore structured to block light subjected to wavelength conversion (visible light) while transmitting laser light. In this case, the wavelength of light subjected to wavelength conversion and the wavelength of laser light are preferably separated from each other as shown in FIG. 8, and the semiconductor laser element 102, the fluorescent substance 104, and the optical filter 107 are preferably structured as follows.

The semiconductor laser element 102 is preferably formed of a semiconductor laser element that emits blue-violet laser light or ultraviolet laser light. The fluorescent substance 104 is preferably structured to emit blue light, green light, and red light that are created by converting a portion of laser light. The optical filter 107 is preferably structured to transmit blue-violet light and ultraviolet light while reflecting or absorbing visible light (blue light, green light, red light, and the like). This optical filter 107 may be, for example, UTVAF-33U, a product of SIGMA KOKI Co., Ltd.

The control part 109 in the second embodiment includes a determining part 109*a*, which, unlike the first embodiment, determines whether or not the intensity of light detected by the light receiving element 108 (value of a current flowing through the light receiving element 108) is equal to or more than a given value (threshold), and a control signal generating part 109*b*, which outputs a stop signal for stopping the driving of the semiconductor laser element 102 to the driver circuit 10 based on a determination output from the determining part 109*a*. In short, in the second embodiment, it is determined that the fluorescent substance 104 has a chip or other defects and the driving of the semiconductor laser element 2 is stopped when the intensity of light detected by the light receiving element 108 is equal to or more than a given value.

In the second embodiment, the photo sensor 111 and the control part 109 constitute a safety device which prevents coherent laser light from exiting the light emitting device 101.

The rest of the structure of the second embodiment is the same as in the first embodiment.

In the light emitting device 101 according to the second embodiment, the driving of the semiconductor laser element 102 is stopped when the intensity of light detected by the light receiving element 108 reaches a given value (threshold) or higher. The rest of the operation of the light emitting device 101 according to the second embodiment is the same as in the first embodiment.

The second embodiment provides the same effects that are obtained in the first embodiment.

Third Embodiment

Figure 9:
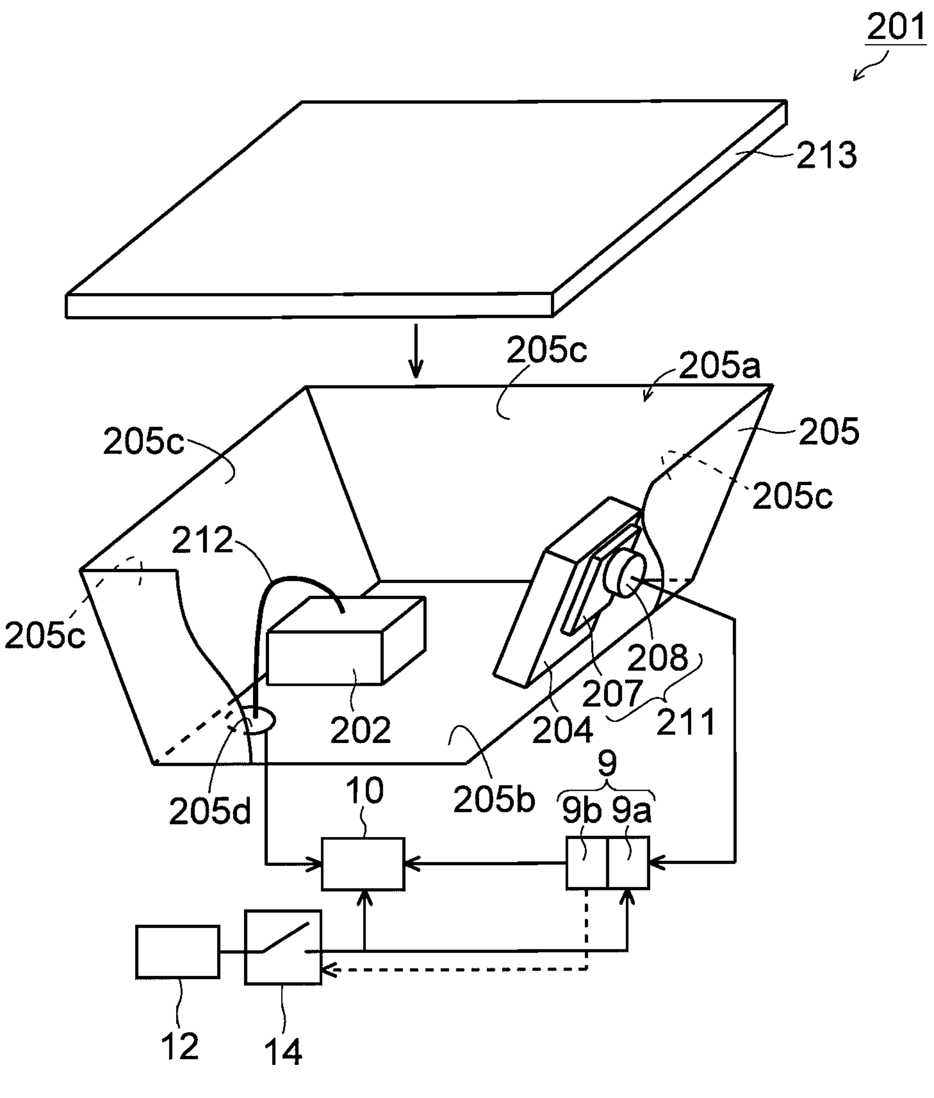
FIG. 9 is an exploded perspective view illustrating the structure of a light emitting device according to a third embodiment of the present invention.

A light emitting device 201 according to a third embodiment of the present invention includes, as illustrated in FIG. 9, a semiconductor laser element 202, which functions as a laser light source, a fluorescent substance 204, which is irradiated with laser light emitted from the semiconductor laser element 202, an optical filter 207, which has a function of blocking light that has a given wavelength, a light receiving element 208, the control part 9, which is electrically connected to the light receiving element 208, the driver circuit 10, which is electrically connected to the semiconductor laser element 202 and the control part 9, and a laser light blocking filter 213. The fluorescent substance 204 is an example of the "optical conversion member" of the present invention, and the optical filter 207 is an example of the "first optical filter" of the present invention. The laser light blocking filter 213 is an example of a "safety device" and a "second optical filter" of the present invention.

A concave part 205*a* of a reflecting member 205 has inside faces which are made up of a bottom face 205*b* and a plurality of side faces 205*c* sloped to the bottom face 205*b*. The bottom face 205*b* and the plurality of side faces 205*c* are formed into mirror surfaces which have a function of reflecting light. Alternatively, the concave part 205*a* of the reflecting member 205 may have an inner surface that is a partial ellipsoid or a paraboloid, or may be asymmetric in the top-bottom direction or in the left-right direction.

A terminal part 205*d* is provided on the bottom face 205*b* of the reflecting member 205. The terminal part 205*d* is electrically connected to the semiconductor laser element 202 via a metal wire 212. The terminal part 205*d* is also electrically connected to the driver circuit 10 and the control part 9.

The optical filter 207 and the light receiving element 208 constitute a photo sensor 211. The photo sensor 211 is placed between the fluorescent substance 204 and one of the side faces 205*c* of the reflecting member 205. The photo sensor 211 may instead be placed on the outside of the reflecting member 205 by forming an opening (not shown) in one of the side faces 205*c* of the reflecting member 205.

In the third embodiment, the optical filter 207 is formed from KRS-5, KRS-6, or the like, and has a function of blocking light that has not undergone wavelength conversion by the fluorescent substance 204 while transmitting at least a portion of light subjected to wavelength conversion by the fluorescent substance 204.

A portion of laser light irradiating the fluorescent substance 204 is sometimes transmitted through the fluorescent substance 204. However, in the third embodiment where the optical filter 207 is placed between the fluorescent substance 204 and the light receiving element 208, light accidentally transmitted through the fluorescent substance 204 is blocked by the optical filter 207 and does not enter the light receiving element 208.

In the third embodiment, the photo sensor 211 and the control part 9 constitute a safety device for preventing coherent laser light from exiting the light emitting device 201.

The laser light blocking filter 213 is placed on the light exit side of the light emitting device 201 so as to cover an open end of the concave part 205*a* of the reflecting member 205. The laser light blocking filter 213 has a function of reflecting or absorbing light that has a wavelength around the center wavelength of laser light. When the fluorescent substance 204 is chipped off or otherwise develops a defect, the laser light blocking filter 213 prevents laser light from exiting the light emitting device 201. In short, the light emitting device 201 in the third embodiment has a double safety device for preventing coherent laser light from exiting the light emitting device 201: a safety device constituted of the photo sensor 211 and the control part 9; and a safety device constituted of the laser light blocking filter 213.

The laser light blocking filter 213 does not always need to reflect or absorb light 100%. It is sufficient if the coherent component of light transmitted through the laser light blocking filter 213 and exiting to the outside is at the level of, for example, Class 1 of the laser light safety standard in Japan (JIS C 6802) or lower.

The rest of the structure and the operation of the third embodiment is the same as in the first embodiment.

In the third embodiment, the laser light blocking filter 213 is provided as described above, to thereby prevent the exit of coherent laser light out of the light emitting device 201 even for the brief period of time from the chipping of, or the development of other defects in, the fluorescent substance 204 for some reason to the cessation of the driving of the semiconductor laser element 202. The safety to the eye is thus improved even more.

Other effects provided by the third embodiment are the same as those obtained in the first embodiment.

The third embodiment deals with an example of equipping the light emitting device 201 with a safety device that is constituted of the photo sensor 211 and the control part 9 and a safety device that is constituted of the laser light blocking filter 213. However, the present invention is not limited thereto, and the light emitting device 201 may be equipped with only the safety device that is constituted of the laser light blocking filter 213. With this structure, laser light traveling outward from the reflecting member 205 is blocked by the laser light blocking filter 213 and does not exit to the outside, and hence the safety to the eye is ensured. The laser light blocking filter 213 in this case is irradiated with laser light at a close distance, and therefore needs to be durable. Still, this is a minor inconvenience compared to an advantage of the laser light blocking filter 213, which is that blocking laser light by the laser light blocking filter 213 reduces outward visible light emission to a degree that can be used to alert the user to an anomaly in the fluorescent substance 204 or other components. The supply of electric power to the semiconductor laser element 202 can thus be stopped manually or otherwise in a short time after the occurrence of an anomaly.

Fourth Embodiment

A light emitting device 301 according to a fourth embodiment of the present invention is obtained by separating the light emitting device 1 of FIG. 1 into a light emitting device unit 301*a* (part enclosed by the dotted line), which is sold alone or as a part of a system, and a mount body 301*b* (part enclosed by the dot-dash line), to which the light emitting device unit 301*a* is attached.

The light emitting device unit 301*a* includes the semiconductor laser element 2, the light guiding member 3, the fluorescent substance 4, the transparent member 6, the reflecting member 5, and the photo sensor 11. The monitor sensor 13 is provided if necessary. The light emitting device unit 301*a* operates the same way as the light emitting device 1 of FIG. 1, and laser light emitted from the semiconductor laser element 2 exits as white light to the outside.

The mount body 301*b* includes the control part 9 and the power source 12. Receiving an output of the photo sensor 11, the control part 9 generates a control signal (drive signal or stop signal) addressed to the driver circuit 10. When damage to or other defects in the fluorescent substance 4 cause a reduction of visible light having a wavelength equal to or longer than approximately 500 nm, the control part 9 operates the same way as the light emitting device 1 of FIG. 1 to output a stop signal to the driver circuit 10. With the stop signal, the semiconductor laser element 2 stops emitting laser light and the exit of laser light to the outside is averted as a result.

A connector (not shown) is provided in a junction between the light emitting device unit 301*a* and the mount body 301*b*. Through this connector, the control part 9 in the mount body 301*b* is electrically connected to the photo sensor 11 and the driver circuit 10 in the light emitting device unit 301*a*, and electric power is supplied from the power source 12 to the driver circuit 10.

The described structure of the light emitting device 301 may be put into practical use in automobile headlights and various illumination systems. The light emitting device unit 301*a* is easy to replace in the course of maintenance.

Figure 10:
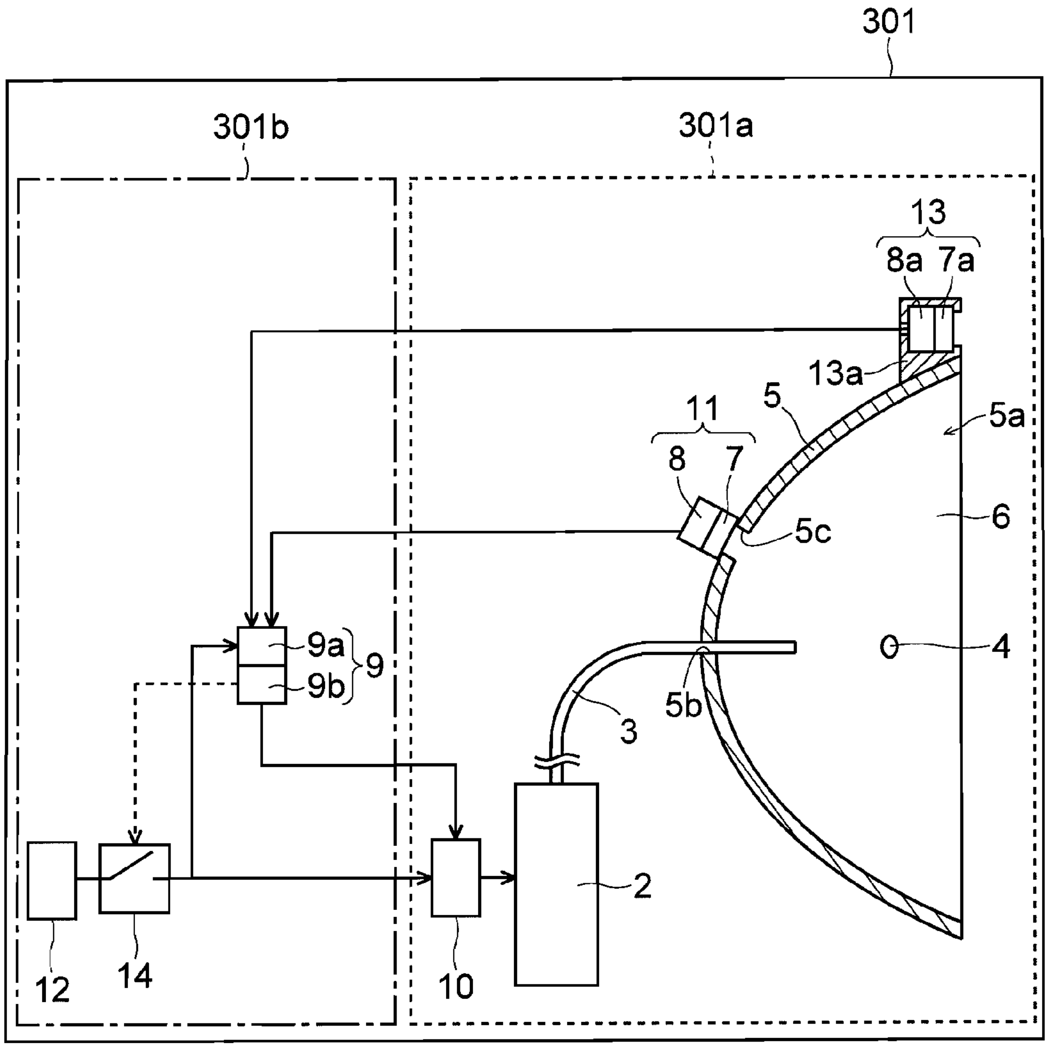
FIG. 10 is a diagram illustrating the structure of a light emitting device according to a fourth embodiment of the present invention.

The determining part 9*a*, which is provided in the control part 9 in the example of FIG. 10, may instead be provided in the light emitting device unit 301*a*. With this structure, the only action required of the control part 9 is to generate a stop signal addressed to the driver circuit 10 upon reception of an input signal, which means that a general-purpose control IC may be used as the control part 9.

The light emitting device unit 301*a* does not always need the reflecting member 5 because the light emitting device unit 301*a* can prevent laser light from exiting to the outside as long as the light emitting device unit 301*a* includes the semiconductor laser element 2, the fluorescent substance 4, which is irradiated with laser light of the semiconductor laser element 2 and converts the laser light into incoherent light to be emitted, such as visible light, and the photo sensor 11, which detects the intensity of light exiting the fluorescent substance 4.

In other words, as illustrated in FIG. 1 and FIG. 10, the indispensable components of the light emitting device 1 or the light emitting device unit 301*a*, which has the semiconductor laser element 2 as a laser light source, are the semiconductor laser element 2, the driver circuit 10, which drives the semiconductor laser element 2, and the fluorescent substance 4, which is irradiated with laser light from the semiconductor laser element 2 and emits visible light or similar light. When the photo sensor 11 is added as a safety device to the indispensable components, an output of the photo sensor 11 is input to the control part 9, which is provided in a place where the light emitting device 1 or the light emitting device unit 301*a* is mounted, and a given operation is accomplished by the control part 9 and the power source 12.

As described above, while the required components of the light emitting device with the safety device are the semiconductor laser element 2, the driver circuit 10, which drives the semiconductor laser element 2, the fluorescent substance 4, which is irradiated with laser light from the semiconductor laser element 2 and emits incoherent light, and the photo sensor 11, safe operation is not accomplished without the control part 9, the power source 12, and other equipment. Accordingly, all these components constitute the light emitting device.

The disclosed embodiments are, in every respect, exemplifications, and should not be construed as limitations on the scope of the invention.

For instance, a light emitting device of the present invention is applicable to indicator lamps (indicator lights), illuminations, projectors, laser pointers, and other various light emitting devices. The light emitting device of the present invention is also applicable to other various illumination devices than automobile headlights, such as backlights for displays, indoor illumination devices, searchlights, and endoscope illumination devices.

The disclosed embodiments deal with examples in which laser light is converted into visible light, but the present invention is not limited thereto and laser light may be converted into light that is not visible light. For instance, laser light may be converted into infrared light, in which case the light emitting device of the present invention is also applicable to night vision illumination devices for security-use CCD cameras, infrared light emitting devices for infrared heaters, and the like.

The semiconductor laser element of the light emitting device of the present invention may be a high-power semiconductor laser element or a low-power semiconductor laser element.

The disclosed embodiments deal with examples in which a portion of laser light is converted into light having a wavelength longer than that of the laser light. However, the present invention is not limited thereto and a portion of laser light may be converted into light having a wavelength shorter than that of the laser light. In this case, infrared laser light may be converted into visible light by employing a kalium titanyl phosphate (KTP) crystal, a rare earth oxide, a rare earth halide, or the like as an optical conversion member.

The disclosed embodiments deal with examples in which the fluorescent substance is employed as the optical conversion member for converting the wavelength of laser light. However, the present invention is not limited thereto and other materials than a fluorescent substance, for example, a KTP crystal, may be used as the optical conversion member.

The disclosed embodiments deal with examples in which the semiconductor laser element and the fluorescent substance are structured such that white light is obtained by mixing light that has been subjected to wavelength conversion by the fluorescent substance with light that has not undergone the wavelength conversion. However, the present invention is not limited thereto, and the semiconductor laser element and the fluorescent substance may be structured such that the obtained light is not white light.

The disclosed embodiments deal with examples in which the fluorescent substance is placed at a given distance from the semiconductor laser element, but the present invention is not limited thereto and the fluorescent substance may be attached to the semiconductor laser element.

The first and fourth embodiments deal with examples in which an optical fiber is used as the light guiding member, but the present invention is not limited thereto and other materials than an optical fiber may be employed as the light guiding member.

The disclosed embodiments deal with examples in which the optical filter is formed from KRS-5 or KRS-6, or from UTVAF-33U, which is a product of SIGMA KOKI Co., Ltd. However, the present invention is not limited thereto and the optical filter may be formed from other materials than KRS-5, KRS-6, and UTVAF-33U.

The disclosed embodiments deal with examples in which the light emitting device is provided with only one semiconductor laser element, but the present invention is not limited thereto and the light emitting device may be provided with a plurality of semiconductor laser elements.

The disclosed embodiments give concrete structural examples of the optical filter and the light receiving element which are illustrated in FIGS. 5 and 6. However, the present invention is not limited thereto and the optical filter and the light receiving element may have other structures than those illustrated in FIGS. 5 and 6. In the structure of FIG. 5 which is an example of forming the optical filter integrally with the light receiving element (photodiode), a cylindrical part made of a metal and having light-shielding properties is provided on a stem and the optical filter is attached to the cylindrical part. Instead, the light emitting device of the present invention may omit the metal cylindrical part and employ an optical filter that is attached onto the stem to cover the top and sides of a photodiode chip. This means that a portion corresponding to the cylindrical part of FIG. 5 may also be formed from KRS-5 or KRS-6. In the structure of FIG. 6 which is an example of forming the optical filter and the light receiving element (photodiode) as separate parts, a casing made of a metal and having light-shielding properties is provided and the optical filter is attached to the casing. Instead, the light emitting device of the present invention may omit the metal casing and employ an optical filter that is attached so as to cover the light receiving element and a printed circuit board entirely.

The second embodiment deals with an example in which the optical filter that blocks light subjected to wavelength conversion (visible light) is placed between the fluorescent substance and the light receiving element. However, the present invention is not limited thereto and an optical filter called a neutral density (ND) filter which dims laser light and visible light both may be placed between the fluorescent substance and the light receiving element. Compared to visible light which travels in all directions, laser light is highly directional and irradiates the optical filter (light receiving element) at a per-unit area intensity of an entirely different order of magnitude. With an ND filter that has, for example, a 1% or 10% transmittance interposed between the fluorescent substance and the light receiving element, the light receiving element hardly detects visible light incident on the light receiving element, and positively detects light only when laser light enters the light receiving element.

The second embodiment deals with a case in which the wavelength of laser light and the wavelength of light subjected to wavelength conversion are separated from each other. However, the present invention is not limited thereto and the wavelength of laser light and the wavelength of light subjected to wavelength conversion may not be separated from each other. Also in this case, whether or not the fluorescent substance has a chip or other defects can be determined by adjusting a threshold for stopping the driving of the semiconductor laser element.

The first, second, and fourth embodiments deal with examples in which the safety device constituted of the light receiving element and the control part is provided alone. A safety device that is constituted of a laser light blocking filter of the third embodiment may be added to the structures of the first, second, and fourth embodiments.

Figure 11:
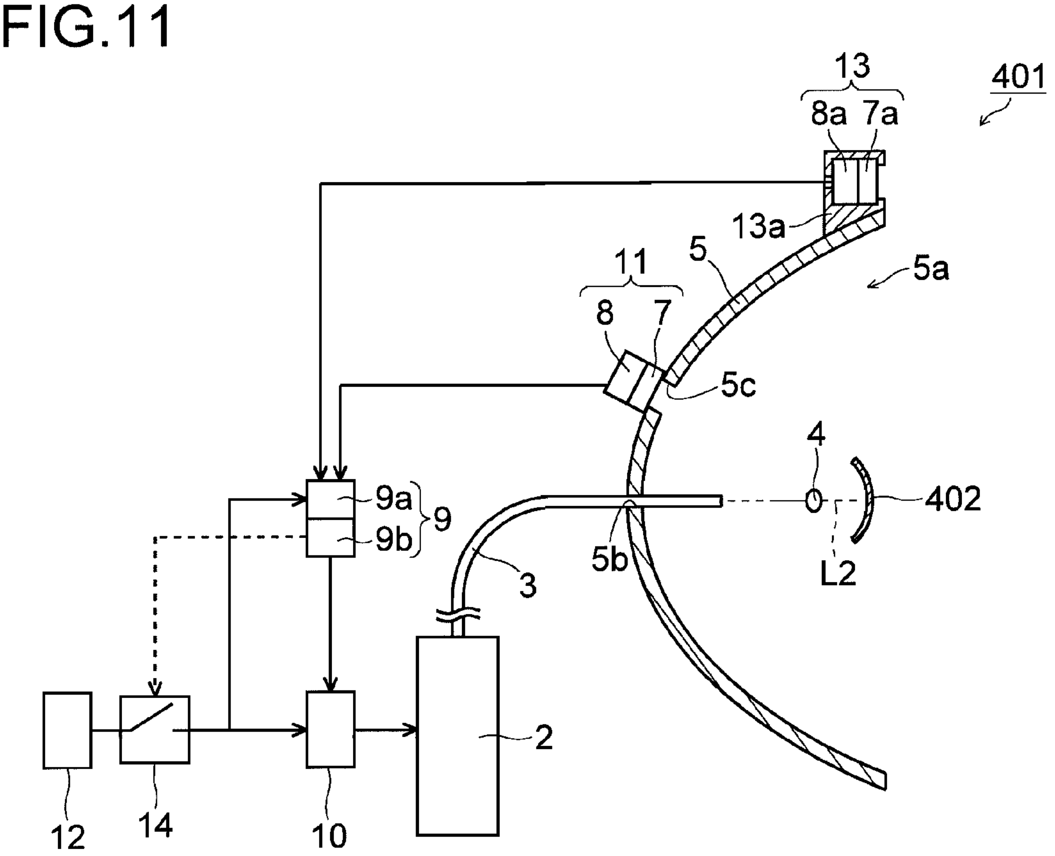
FIG. 11 is a diagram illustrating the structure of a light emitting device according to a first modification example of the present invention.

A reflecting mirror, for instance, may be provided in an extension line extending from a line that connects the semiconductor laser element, the light guiding member, and the fluorescent substance, as in a first modification example of the present invention which is illustrated in FIG. 11. Specifically, the fluorescent substance 4 is placed within the concave part 5*a* of the reflecting member 5, and a reflecting mirror 402, which is a concave mirror, is placed in an extension line L2 extending from a line that connects the light guiding member 3 and the fluorescent substance 4. In this case, the fluorescent substance 4 and the reflecting mirror 402 may be held in given places by a holding member (not shown), instead of providing the transparent member 6 inside the concave part 5*a* of the reflecting member 5. With this structure, light accidentally transmitted through the fluorescent substance 4 is reflected to irradiate the fluorescent substance 4 again and to undergo wavelength conversion this time. Even in the case where the reflecting mirror 402 is placed in the extension line L2 extending from a line that connects the light guiding member 3 and the fluorescent substance 4, as in the first modification example of the present invention which is illustrated in FIG. 11, a chip or other defects in the fluorescent substance 4 cause laser light exiting the light guiding member 3 to be reflected by the reflecting mirror 402 and the reflecting member 5 and exit to the outside of a light emitting device 401 while remaining coherent light. Laser light also exits directly to the outside when the fluorescent substance 4 or the reflecting mirror 402 is displaced or falls off. Therefore, this structure also needs the safety device constituted of the photo sensor 11, the control part 9, and other components.

The photo sensor 11 in the first modification example is the same as the one that is used in the first and fourth embodiments. Instead, a photo sensor that detects only laser light may be provided to detect damage to the fluorescent substance 4, because damage to the fluorescent substance 4 causes laser light to be reflected by the reflecting mirror 402 and enter the photo sensor 11 as well. The optical filter 7 may be omitted while the light receiving element 8 is mounted alone to pick up a change in spectrum (change from visible light to laser light) as a change in light intensity. This is because, although damage to the fluorescent substance 4 causes both of light that does not undergo wavelength conversion by the fluorescent substance 4 and laser light reflected by the reflecting mirror 402 in the manner described above to enter the photo sensor 11, the intensity of the laser light is incomparably higher than that of the other light at the same wavelength, and the photo sensor 11 outputs an unmistakably high detection value when the laser light enters the photo sensor 11.

Figure 12:
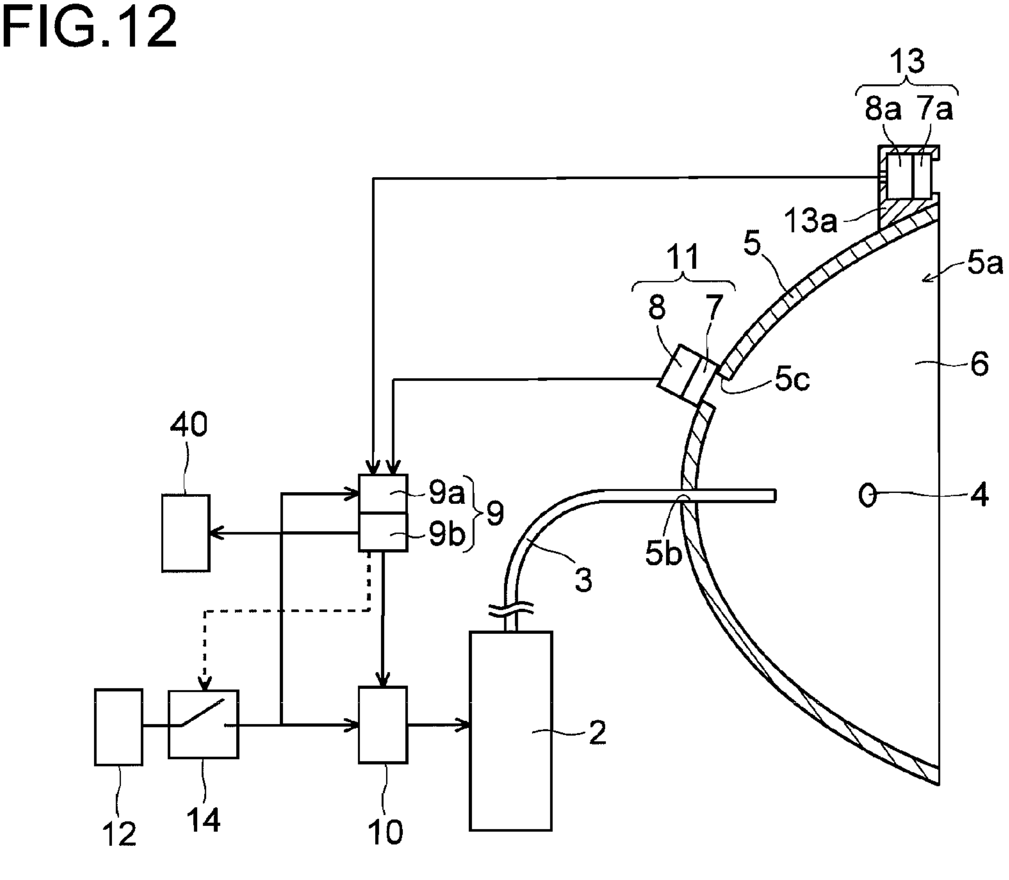
FIG. 12 is a diagram illustrating the structure of a light emitting device according to a second modification example of the present invention.
Figure 13:
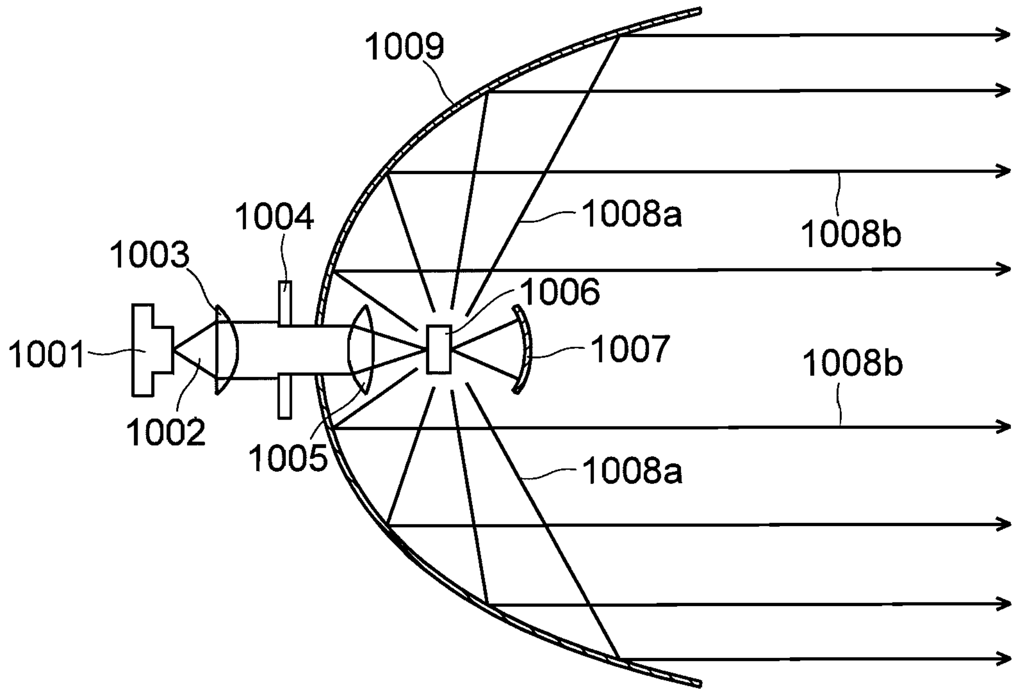
FIG. 13 is a diagram illustrating the structure of a light emitting device disclosed in JP 2003-295319 A.

The disclosed embodiments deal with examples in which the driving of the semiconductor laser element (laser light emission) is stopped when the intensity of light detected by the light receiving element is equal to or less than a given value, or when the detected intensity is equal to or more than a given value. However, the present invention is not limited thereto and, instead of automatically stopping the driving of the semiconductor laser element, the light emitting device may be structured such that a user of the light emitting device is informed of an anomaly, or the direction of the light emitting device or the illumination device is changed, when the intensity of light detected by the light receiving element is equal to or less than a given value, or when the detected intensity is equal to or more than a given value. In the case where the light emitting device is designed to inform the user of an anomaly, an alarm part 40 may be electrically connected to the control part 9 as in a second modification example of the present invention which is illustrated in FIG. 12. The alarm part 40 may alert the user via, for example, the user's visual sense or auditory sense, or a combination of the two. The alarm part 40 may also be an additional component of the structures of the disclosed embodiments, in which the driving of the semiconductor laser element is stopped automatically.

The disclosed embodiments describe cases where laser light fails to be converted into incoherent light due to a chip or other defects in the optical conversion member. When laser light does not irradiate the fluorescent substance and consequently fails to be converted into incoherent light because, for example, a direction in which laser light exits is changed in the light guiding member or the semiconductor laser element for some reason, the exit of the laser light to the outside can be prevented with the use of, for example, the safety device described in the first, third, and fourth embodiments, or the safety device described in the first and second modification examples of the present invention.

The disclosed embodiments describe examples in which one of light subjected to wavelength conversion and laser light is detected. However, the present invention is not limited thereto and intensity of both of light subjected to wavelength conversion and laser light may be detected. In other words, the safety device of the first embodiment and the safety device of the second embodiment may be used in combination, for example.

The disclosed embodiments describe examples in which the photo sensor and the determining part are provided separately, but the present invention is not limited thereto and the determining part may be integrated with the photo sensor.

A condenser lens for collecting laser light that is emitted from the semiconductor laser element to the fluorescent substance or to the light guiding member may be provided between the semiconductor laser element and the fluorescent substance. This improves the utilization efficiency of laser light emitted from the semiconductor laser element.

What is claimed is:

1. A light emitting device, comprising:

a semiconductor laser element for emitting laser light, which is coherent laser light;

an optical conversion member for converting the coherent laser light which is emitted from the semiconductor laser element into incoherent light, and for emitting the incoherent light; and a safety device for preventing the coherent laser light from exiting to an outside of the light emitting device, wherein the safety device includes a photo sensor for detecting intensity of at least one of the incoherent light and the coherent laser light exiting to the outside, the photo sensor includes, a first optical filter for blocking one of light that has substantially the same wavelength as a wavelength of the laser light and the incoherent light and for transmitting at least a portion of other of the light that has substantially the same wavelength as the wavelength of the laser light and the incoherent light, and a light receiving element for detecting intensity of light transmitted through the first optical filter, and the laser light to be converted by the optical conversion member is a single-wavelength laser light.

2. A light emitting device according to claim 1, further comprising a determining part for comparing a detection output of the photo sensor against a reference value to determine whether or not the coherent laser light has exited to the outside.

3. A light emitting device according to claim 2, wherein, when the photo sensor detects the intensity of the incoherent light, the determining part determines whether or not the intensity of the incoherent light detected by the photo sensor is equal to or less than a given value, and wherein, when the photo sensor detects the intensity of the laser light, the determining part determines whether or not the intensity of the laser light detected by the photo sensor is equal to or more than a given value.

4. A light emitting device according to claim 2, further comprising a control signal generating part for stopping laser light emission of the semiconductor laser element based on a determination output from the determining part indicating that the coherent laser light has exited to the outside.

5. A light emitting device according to claim 2, further comprising an alarm part which is driven based on a determination output from the determining part indicating that the coherent laser light has exited to the outside.

6. A light emitting device according to claim 1, wherein the first optical filter is attached to the light receiving element.

7. A light emitting device according to claim 1, wherein the first optical filter comprises one of thallium bromide iodide and thallium bromide chloride.

8. A light emitting device according to claim 1, wherein the photo sensor is placed in a light path of the incoherent light to detect the intensity of the incoherent light.

9. A light emitting device according to claim 1, wherein the photo sensor is placed in an extension line extending on the optical conversion member side from a line that connects the semiconductor laser element and the optical conversion member, to detect the intensity of the coherent laser light exiting to the outside.

10. A light emitting device according to claim 1, wherein the photo sensor comprises a photodiode.

11. A light emitting device according to claim 1, wherein the safety device comprises a second optical filter, which is placed on a light exit side of the light emitting device to block the laser light.

12. A light emitting device according to claim 1, wherein the optical conversion member converts at least a portion of the laser light emitted from the semiconductor laser element into incoherent light having a wavelength longer than a wavelength of the laser light.

13. A light emitting device according to claim 12, wherein the semiconductor laser element emits laser light that has a wavelength equal to or less than 500 nm.

14. A light emitting device according to claim 13, wherein the optical conversion member converts at least a portion of the laser light emitted from the semiconductor laser element into incoherent light having a wavelength longer than 500 nm.

15. A light emitting device according to claim 14, wherein the semiconductor laser element emits one of blue laser light, blue-violet laser light, and ultraviolet laser light.

16. An illumination device, comprising the light emitting device according to claim 1, and a reflecting mirror for projecting the incoherent light.

17. A photo sensor for use in a safety device of a light emitting device, comprising:

an optical conversion member for converting a coherent, single-wavelength laser light emitted from a semiconductor laser element into incoherent light and for emitting the incoherent light, wherein the photo sensor detects intensity of at least one of the incoherent light and the coherent laser light exiting to an outside of the light emitting device, and the photo sensor further comprises, a first optical filter for blocking one of light that has substantially the same wavelength as a wavelength of the laser light and the incoherent light subjected to wavelength conversion by the optical conversion member and for transmitting at least a portion of other of the light that has substantially the same wavelength as the wavelength of the laser light and the incoherent light subjected to the wavelength conversion by the optical conversion member, and a light receiving element for detecting intensity of light transmitted through the first optical filter.

18. A photo sensor according to claim 17, further comprising a determining part for comparing a detection output of the photo sensor against a reference value to determine whether or not the coherent laser light has exited to the outside.

19. A photo sensor according to claim 18, wherein, when the photo sensor detects the intensity of the incoherent light, the determining part determines whether or not the intensity of the incoherent light detected by the photo sensor is equal to or less than a given value, and wherein, when the photo sensor detects the intensity of the laser light, the determining part determines whether or not the intensity of the laser light detected by the photo sensor is equal to or more than a given value.

* * * * *